(12) United States Patent
Thubert et al.

(10) Patent No.: US 9,246,794 B2
(45) Date of Patent: Jan. 26, 2016

(54) LABEL DISTRIBUTION AND ROUTE INSTALLATION IN A LOOP-FREE ROUTING TOPOLOGY USING ROUTING ARCS

(75) Inventors: Pascal Thubert, La Colle sur Loup (FR); Patrice Bellagamba, Saint-Raphael (FR); Dirk Anteunis, Fayence (FR); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 13/566,029

(22) Filed: Aug. 3, 2012

(65) Prior Publication Data

US 2014/0036729 A1 Feb. 6, 2014

(51) Int. Cl.
*H04L 12/28* (2006.01)
*H04L 12/705* (2013.01)
*H04L 12/723* (2013.01)
*H04L 12/751* (2013.01)
*H04L 12/721* (2013.01)
*H04L 12/707* (2013.01)
*H04L 12/703* (2013.01)

(52) U.S. Cl.
CPC .............. *H04L 45/18* (2013.01); *H04L 45/02* (2013.01); *H04L 45/12* (2013.01); *H04L 45/22* (2013.01); *H04L 45/28* (2013.01); *H04L 45/507* (2013.01)

(58) Field of Classification Search
CPC ....... H04L 45/507; H04L 45/02; H04L 45/12; H04L 45/18; H04L 45/22; H04L 45/28
USPC ........................................................ 370/255
See application file for complete search history.

(56) References Cited

U.S. PATENT DOCUMENTS

| | | | |
|---|---|---|---|
| 7,161,929 B1 | 1/2007 | O'Neill et al. | |
| 7,656,857 B2 | 2/2010 | Thubert et al. | |
| 7,693,064 B2 * | 4/2010 | Thubert et al. | 370/235 |
| 7,801,031 B2 | 9/2010 | Chao et al. | |
| 7,801,136 B2 * | 9/2010 | Tian | 370/390 |
| 2002/0176371 A1 * | 11/2002 | Behzadi | 370/254 |
| 2003/0046426 A1 | 3/2003 | Nguyen | |
| 2007/0086358 A1 | 4/2007 | Thubert et al. | |
| 2010/0188979 A1 | 7/2010 | Thubert et al. | |
| 2011/0080853 A1 * | 4/2011 | Thubert et al. | 370/255 |

(Continued)

OTHER PUBLICATIONS

Tripathi et al ("First IEEE International Conference on Smart Grid Communication (2010)" pp. 262-267 featured article Applicability Study of RPL with Local Repair in Smart Grid Substation Networks published Oct. 4 2010).*

(Continued)

*Primary Examiner* — Andrew Lai
*Assistant Examiner* — Albert Shih
(74) *Attorney, Agent, or Firm* — Leon R. Turkevich

(57) ABSTRACT

In one embodiment, a method comprises creating, in a computing network, a loop-free routing topology for reaching a destination device, the loop-free routing topology comprising distinct paths for reaching the destination device; generating a set of serialized representations describing the loop-free routing topology, each serialized representation describing a corresponding one of the paths; and propagating the set of serialized representations from the destination device to network nodes in the computing network, enabling the network nodes to establish loop-free label switched paths for reaching the destination device via the loop-free routing topology.

20 Claims, 28 Drawing Sheets

(56) References Cited

U.S. PATENT DOCUMENTS

2012/0300668 A1    11/2012   Thubert et al.
2014/0098711 A1*   4/2014   Thubert ................ H04L 45/128
                                                                             370/255

OTHER PUBLICATIONS

Winter et al ("RPL: IPv6 Routing Protocol for Low power and Lossy Networks draft-ietf-roll-rpl-04" published Oct. 26 2009.*

Thubert et al., U.S. Appl. No. 13/113,113, filed May 23, 2011.

Thubert et al., U.S. Appl. No. 13/371,065, filed Feb. 10, 2012.

Thubert et al., U.S. Appl. No. 13/467,603, filed May 9, 2012.

Martini et al., "Inter-Chassis Communication Protocol for L2VPN PE Redundancy", [online], Jul. 9, 2011, [retrieved on Jul. 16, 2012]. Retrieved from the Internet: <URL: http://tools.ietf.org/pdf/draft-ietf-pwe3-iccp-06.pdf>, pp. 1-78.

Atlas, Ed., "An Architecture for IP/LDP Fast-Reroute Using Maximally Redundant Trees", [online], Mar. 12, 2012, [retrieved on Jul. 16, 2012]. Retrieved from the Internet: <URL: http://tools.ietf.org/pdf/draft-ietf-rtgwg-mrt-frr-architecture-01.pdf>, pp. 1-25.

DocWiki, "MPLS/TAG Switching", [online], Oct. 15, 2010, [retrieved on Jul. 13, 2012]. Retrieved from the Internet: <URL: http://docwiki.cisco.com/wiki/MPLS/Tag_Switching>, pp. 1-10.

Rosen et al., "Multiprotocol Label Switching Architecture", Network Working Group, Request for Comments: 3031, Jan. 2001, pp. 1-61.

Anderson et al., "LDP Specification", Network Working Group, Request for Comments: 3036, Jan. 2001, pp. 1-133.

Anderson et al., "LDP Specification", Network Working Group, Request for Comments: 5036, Oct. 2007, pp. 1-135.

Smith et al., "Label Edge Router Forwarding of IPv4 Option Packets", Internet Engineering Task Force, Request for Comments: 6178, Mar. 2011, pp. 1-9.

PCT/US12/39039 International Search Report, Aug. 24, 2012, 9 pages.

Cho et al. "Resilient multipath routing with independent directed acyclic graphs", Proceedings of IEEE International Conference on Communications (ICC), [online], May 2010, [retrieved on Oct. 30, 2012]. Retrieved from the Internet: <URL: http://ieeexplore.ieee.org/stamp/stamp.jsp?tp=&arnumber=5502526>, 5 pages.

Cho et al., Independent Directed Acyclic Graphs for Resilient Multipath Routing:, IEEE/ACM Transactions on Networking, vol. 1, No. 20, [online], Feb. 20, 2012, [retrieved on Oct. 24, 2012]. Retrieved from the Internet: <URL: http://srini.ca/p/Srini-2011-TON-IDAGS.pdf>, pp. 153-162.

Erlebach et al., "Path Splicing with Guaranteed Fault Tolerance", IEEE GLOBECOM 2009 Proceedings, [online], [retrieved on Oct. 23, 2012]. Retrieved from the Internet: <URL: http://202.194.20.8/GLOBECOM2009/DATA/PID960701.PDF>, 6 pages.

Erlerbach et al., "Path Splicing with Guaranteed Fault Tolerance", Dynamo 2009, Dagstuhl, Germany, [online], [retrieved on Nov. 26, 2012]. Retrieved from the Internet: <URL: http://cost295.lboro.ac.uk/docs/dagstuhl/files/erlebach.pdf>, 52 pages.

Nelakuditi et al., "Fast Local Rerouting for Handling Transient Link Failures", [online], 2007, pp. 1-14.

Atlas, Ed., "U-turn Alternatives for IP/LDP Local Protection", [online], Jul. 8, 2004 [retrieved on Apr. 11, 2011] Network Working Group, Internet-Draft, <draft-atlas-ip-local-protect-uturn-00>. Retrieved from the Internet: <URL: http://tools.ietf.org/html/draft-atlas-ip-local-protect-uturn-00>, pp. 1-30.

Atlas, Ed., "U-turn Alternates for IP/LDP Fast-Reroute", [online], Feb. 2006, [retrieved on Sep. 28, 2010] Network Working Group, Internet-Draft, <draft-atlas-ip-local-protect-uturn-03>. Retrieved from the Internet: <URL: http://toolsietf.org/html/draft-atlas-ip-local-protect-uturn-03>, pp. 1-29.

Winter, Ed., "RPL: Routing Protocol for Low Power and Lossy Networks", [online], Aug. 3, 2009, [retrieved on Apr. 11, 2011]. Network Working Group, Internet-Draft, <draft-ietf-roll-rpl-00>. Retrieved from the Internet: <URL: http://tools.ieft.org/html/draft-ietf-roll-rpl-00>, pp. 1-69.

Atlas, Ed. et al., "Basic Specification for IP Fast Reroute: Loop-Free Alternates", [online], Sep. 2008, [retrieved on Aug. 17, 2010]. Network Working Group, Request for Comments: 5286. Retrieved from the Internet: <URL: http://tools.ietf.org/html/rfc5286>, pp. 1-31.

Filsfils et al., "LFA applicability in SP networks", [online], Mar. 1, 2010, [retrieved on Aug. 29, 2011]. Network Working Group, Internet-Draft, <draft-filsfils-rtgwg-lfa-applicability-00>. Retrieved from the Internet: <URL: http://tools.ietf.org/html/draft-filsfils-rtgwg-lfa-applicability-00>, pp. 1-28.

Atlas et al., "Algorithms for computing Maximally Redundant Trees for IP/LDP Fast-Reroute", [online], Oct. 24, 2011, [retrieved on Nov. 30, 2011]. Routing Area Working Group, IETF Draft, <draft-enyedi-rtgwg-mrt-frr-algorithm-00>. Retrieved from the Internet: <URL: http://tools.ietf.org/id/draft-enyedi-rtgwg-mrt-frr-algorithm-00.txt>, pp. 1-40.

Ramasubramanian et al., "Providing a bidirectional abstraction for unidirectional ad hoc networks", Proceedings IEEE INFOCOM 2002, The Conference on Computer Communications, 21st Annual Joint Conference of the IEEE Computer and Communications Societies, New York, NY. Jun. 23-27, 2002, vol. 3, Jun. 23, 2002, XP010593692, pp. 1258-1267.

\* cited by examiner

| Figure 3C |
| Figure 3D |

66

```
resolve_neighbor(N){
```
→ (A.) If N has a single link, it is a leaf: label N as leaf, mark the link resolved and return;

→ (B.) If N is not a safe node, assign all non-SPF links as incoming to N and label as unresolved to nearest safe node S; return;

→ (C.) Resolve each of safe node N's links (N,i) in SPF order (Shortest, outgoing, incoming):

→ (C.1.) if the link (N,i) is resolved (i.e., not marked ?-x), then if link (N, i) ends in another junction or root then the link (N,i) terminates an arc; return to (C.) for next link (N, i+1);

→ (C.2.) if the link (N,i) is outgoing:

→ (C.2.a.) if the link (N,i) ends in another junction or the root, mark it resolved (this link (N,i) terminates an arc); else To Figure 3D

Figure 3C

State Table, 54

Figure 4
- Figure 4A
- Figure 4B
- Figure 4C
- Figure 4D

| Event | Network Node under Analysis | Link Analysis, Status Change(s) | Node Status Change(s) |
|---|---|---|---|
| 200 | R | A→R; B→R | R=Root |
| 202 | A | A→R = Resolved (SPF); D→A = ?-A; C→A = ?-A | A= Heir |
| 204 | B | B→R = Resolved (SPF); K→B = ?-B; | B = Heir |
| 206 | K | K→B = SPF; M→K = ?-B; J→K = ?-B | |
| 208 | M | M→K = SPF; J→M = ?-B | |
| 210 | D | D→A = SPF; C→D = ?-A; E→D = ?-A; L→D = ?-A | |
| 212 | C | C→A = SPF; E→C = ?-A; F→C = ?-A | |
| 214 | L | L→D = SPF; E→L = ?-A | |
| 216 | E | E→C = SPF; F→E = ?-A; G→E = ?-A; H→E = ?-A | |
| 218 | F | F→C = SPF; H→F = ?-A; I→F = ?-A; J→F = ?-A | |
| 220 | N | N→L = Resolved | N = Leaf |
| 222 | G | G→E = SPF; H→G = ?-A | |
| 224 | H | H→F = SPF; I→H = ?-A | |
| 226 | I | I→F = SPF | |
| 228 | J | J→K = SPF, J→K = "Rev" (Reversible); M□→J = ?-J | J = Edge Junction |

From Figure 4A ↓

| | | | |
|---|---|---|---|
| 230 | K(J) | K→B = "Rev"; M→K = ?-K | K = Edge Junction (J→K=Rev); K=Intermediate Junction (K→B= Rev) |
| 232 | B(K,J) | (B→R Already Resolved) | B = Edge Junction, End of Arc |
| 234 | K(J) | (Resolve Next Endpoint M of link M→K) | |
| 236 | M(K, J) | M→K = Resolved (1st End of first collapsed arc ARC1) | M = Junction |
| 238 | K(M,K,J) | (No other links to analyze, return to M) | |
| 240 | M(K, J) | M→J = Resolved (2nd End of first collapsed arc ARC1: first collapsed arc ARC1 completed) | |

↓ To Figure 4C

State Table, 54

Figure 4B

From Figure 4B

State Table, 54

| | | | |
|---|---|---|---|
| 242 | K(J) | (No other links to analyze, return to J) | |
| 244 | J | J→F = Rev | J=Intermediate Junction |
| 246 | F(J) | F→C = Rev; E□→F = ?-F; H→F = ?-F; I→F = ?-F | F=Edge Junction |
| 248 | C(F, J) | C→A = Rev; D□→C = ?-C; E→C = ?-C | C=Edge Junction |
| 250 | A(C, F, J) | (A→R Already Resolved, First Infrastructure Arc ARC2 Formed) | A=Edge Junction, End of ARC2 |
| 252 | D(A, C, F, J) | D→A = Resolved (1st end of second collapsed arc ARC3); D□→C = Resolved (Second Collapsed Arc ARC3 Formed) L→D = ?-D; E→D = ?-D; E→L = ?-D; G→E = ?-D; H→G = ?-D; I→H = ?-D; and H→E = ?-D | D = Junction |
| 254 | E(D, A, C, F, J) | E→C = Resolved (1st end of Second Infrastructure Arc ARC4); E→D = Resolved (1st end of Collapsed Arc ARC8); E→L = Rev | E=Junction |

| | | | |
|---|---|---|---|
| 256 | L(E, D, A, C, F, J) | L→D = Resolved (Second Infrastructure Arc ARC4 Formed) | L=Edge Junction |
| 258 | E(D, A, C, F, J) | E☐→F = Resolved (Collapsed Arc ARC8 formed); G→E = ?-E; H→E = ?-E, H→G = ?-E, and I→H= ?-E | |
| 260 | G(E, D, A, C, F, J) | (no-op, return to E) | |
| 262 | E(D, A, C, F, J) | Call endpoint of H→E | |
| 264 | H(E, D, A, C, F, J) | H→F = Resolved (1d End of Infrastructure Arc ARC5, 1st End of Collapsed Arc ARC6); H→E = Resolved (2nd End of Collapsed Arc ARC6); H→G = Rev | H = Junction |
| 266 | G(H, E, D, A, C, F, J) | G→E = Resolved (2nd End of Infrastructure Arc ARC5) | G = Edge Junction |
| 268 | H(E, D, A, C, F, J) | I→H = ?-H | |
| 270 | I(H, E, D, A, C, F, J) | I→F = Resolved (1st End of Collapsed Arc ARC7); I→H = Resolved (2nd End of Collapsed Arc ARC7) | I = Junction |
| 272 | Return to J, Analysis Complete | | |

State Table, 54

From Figure 4C

Figure 4D

| Arc Topology for Root Node "R" | |
|---|---|
| Root Network Node | R |
| SPF Links | A→R; B→R; C→A; D→A; E→C; F→C; G→E; H→F; I→F; J→K; K→B; L→D; M→K; N→L |
| Junction Nodes | A, B, C, D, E, F, G, H, I, J, K, L, M |
| Leaf Nodes | N |
| Reversible Links | J→K; K→B; J→F; F→C; C→A; E→L; H→G |
| Arc Node Membership | ARC1: J-M-K<br>ARC2 (Base Arc to Root R): B-K-J-F-C-A<br>ARC3: A-D-C<br>ARC4: D-L-E-C<br>ARC5: E-G-H-F<br>ARC6: E-H-F<br>ARC7: H-I-F<br>ARC8: D-E-F |
| Arc Cursor Ownership | ARC1: M (collapsed)<br>ARC2: J<br>ARC3: D (collapsed)<br>ARC4: E<br>ARC5: H<br>ARC6: H (collapsed)<br>ARC7: I (collapsed)<br>ARC8: E (collapsed) |

*Figure 5*

```
┌─────────────────────────────────────────────────────────┐
│ Generate Serialized Arc Format For Each Individual Arc: │──112a
└─────────────────────────────────────────────────────────┘
                            ↓
        ┌──────────────────────────────────────┐
        │ Identify Each Arc by its Arc Cursor  │──112b
        └──────────────────────────────────────┘
                            ↓
┌──────────────────────────────────────────────────────────────┐
│ -Generate List Identifying Contiguous Sequence of Arc Nodes  │
│  Along the Arc ("Source Route Along Arc"), (Optional: List   │──112c
│  Including Exit Nodes of Arc (i.e., Edge Junctions) to form  │
│  Complete Source Route Along Arc)                            │
└──────────────────────────────────────────────────────────────┘
                            ↓
┌──────────────────────────────────────────────────────────────┐
│ -Identify (at Least) First Edge Junction and Second Edge     │
│  Junction of Arc, Add to List (Identifying Location/Placement│──112d
│  of Arc in Topology)                                         │
└──────────────────────────────────────────────────────────────┘
                            ↓
┌──────────────────────────────────────────────────────────────┐
│ - (For Buttressing Arc: Start with Null Exit Node at         │
│   Dominant Junction, Generate Second List of Exit            │──112e
│   Nodes for Exit from Buttressing Arc)                       │
└──────────────────────────────────────────────────────────────┘
```

Figure 9

| ARC Reference | Cursor (Serialized Arc ID) | Serialized Arc Format |   |
|---|---|---|---|
| ARC2 | J | ([R], {B, K, J, F, C, A}, [R]) | ←114a |
| ARC4 | E1 | ([C], {E, L}, [D]) | ←114b |
| ARC5 | H1 | ([F], {H,G}, [E]) | ←114c |
| ARC1 | M | ([K], {M}, [J]) | ←114d |
| ARC3 | D | ([A], {D}, [C]) | ←114e |
| ARC6 | H2 | ([F], {H}, [E]) | ←114f |
| ARC8 | E2 | ([D], {E}, [F]) | ←114g |
| ARC7 | I | ([F], {I}, [H]) | ←114h |

Figure 10

| Multicasting Network Node | Pruning Action by Multicasting Node | Multicasted Set of Serialized Arcs |
|---|---|---|
| Ω(R)→A; A→C; C→F; F→J; Ω(R)→B; B→K; K→J; | (None) | Ω=R: [J, E1, H1, M, D, H2, E2, I] |
| A→D; C→D | Prune J, M | Ω=R: [E1, H1, D, H2, E2, I] |
| C→E; F→E | Prune J, M, D | Ω=R: [E1, H1, H2, E2, I] |
| F→H | Prune J, M, D, E1, E2 | Ω=R: [H1, H2, I] |
| F→I | Prune J, M, D, E1, E2, H1, H2 | Ω=R: [I] |
| D→E | Further Prune D | Ω=R: [E1, H1, H2, E2, I] |
| D→L | Further Prune D, H1, H2, E2, I | Ω=R: [E1] |
| L→E | Further Prune H1, H2, E2, I | Ω=R: [E1] |
| E→G | Further Prune H1, H2, E2, I | Ω=R: [H1] |
| E→H | Further Prune E1, E2 | Ω=R: [H1, H2, I]] |
| G→H | (None) | Ω=R: [H1] |
| H→I | Further Prune H1, H2 | Ω=R: [I] |
| K→M; J→M | Prune J, E1, H1, D, H2, E2, I | Ω=R: [M] |

| Incoming | R_IF, R_HF, R_EF | R_JF | R_CF | R_CF_FRR | R_JF_FRR |
|---|---|---|---|---|---|
| Primary | R_FC | R_FC | R_FJ | R_FJ_FRR | R_FC_FRR |
| Backup | R_FJ | R_FJ_FRR | R_FC_FRR | <drop> | <drop> |

Local Forwarding Table (Node "F"), 148

Figure 15

LABEL DISTRIBUTION AND ROUTE INSTALLATION IN A LOOP-FREE ROUTING TOPOLOGY USING ROUTING ARCS

TECHNICAL FIELD

The present disclosure generally relates to generating a loop-free routing topology in a computing network, such as an Internet Protocol (IP) network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing routing protocols assume recalculation of routes can be performed in response to a detected failure (e.g., loss of a link or a connecting network node); however, recalculation of routes requires computation time that likely results in a loss of data traffic. One attempt to accelerate responding to a detected failure includes "Loop Free Alternates" (LFA), where a router can respond to losing a next hop router in a path to a destination node by identifying a feasible successor for reaching the destination node, as long as the feasible successor does not create a loop by sending the packet back to the router. The IETF Draft by Atlas, entitled "U-turn Alternates for IP/LDP Local Protection (draft-atlas-ip-local-protect-uturn-00.txt)", illustrates in FIG. 3 of the IETF Draft a network topology where LFA solutions can be provided for the network nodes N2, N4, and R3 to forward a data packet to the destination node D in the event of a failed link, however, LFA cannot provide any solutions for any of the network nodes N3, S, P, R1, or R2. The IETF Draft by Atlas proposed a "U-turn protocol" to reverse a link; however, the U-turn protocol cannot provide any solution for the nodes P, R1, or R2 of FIG. 3 in the event of a link failure.

Another proposed routing protocol, referred to as "Fast Local Rerouting for Handling Transient Link Failures" (FIR) requires a complete recalculation of routes in response to a link failure, and hence recalculation of routes requires computation time that likely results in a loss of data traffic.

BRIEF DESCRIPTION OF THE DRAWINGS

Reference is made to the attached drawings, wherein elements having the same reference numeral designations represent like elements throughout and wherein:

FIGS. 3A, 3B, 3C and 3D illustrate example methods for creating a loop-free routing topology, according to an example embodiment.

FIG. 4 (consisting of FIGS. 4A, 4B, 4C and 4D) illustrate an example data structure in the memory circuit of the apparatus of FIG. 2 used for creation of a loop-free routing topology, according to an example embodiment.

FIG. 5 illustrates another example data structure in the memory circuit of the apparatus of FIG. 2 used for creation of a loop-free routing topology, according to an example embodiment.

FIG. 9 illustrates an example method of generating a serialized representation of a path in the loop-free routing topology, according to an example embodiment.

FIG. 10 illustrates the set of serialized representations describing the loop-free routing topology, according to an example embodiment.

FIG. 12 illustrates selective pruning of selected paths from the set of serialized representations propagated from the destination device by network nodes within the loop-free routing topology, according to an example embodiment.

FIG. 15 illustrates an example label forwarding table built in one of the network nodes of FIG. 6I, according to an example embodiment.

DESCRIPTION OF EXAMPLE EMBODIMENTS

Overview

Figure 1:
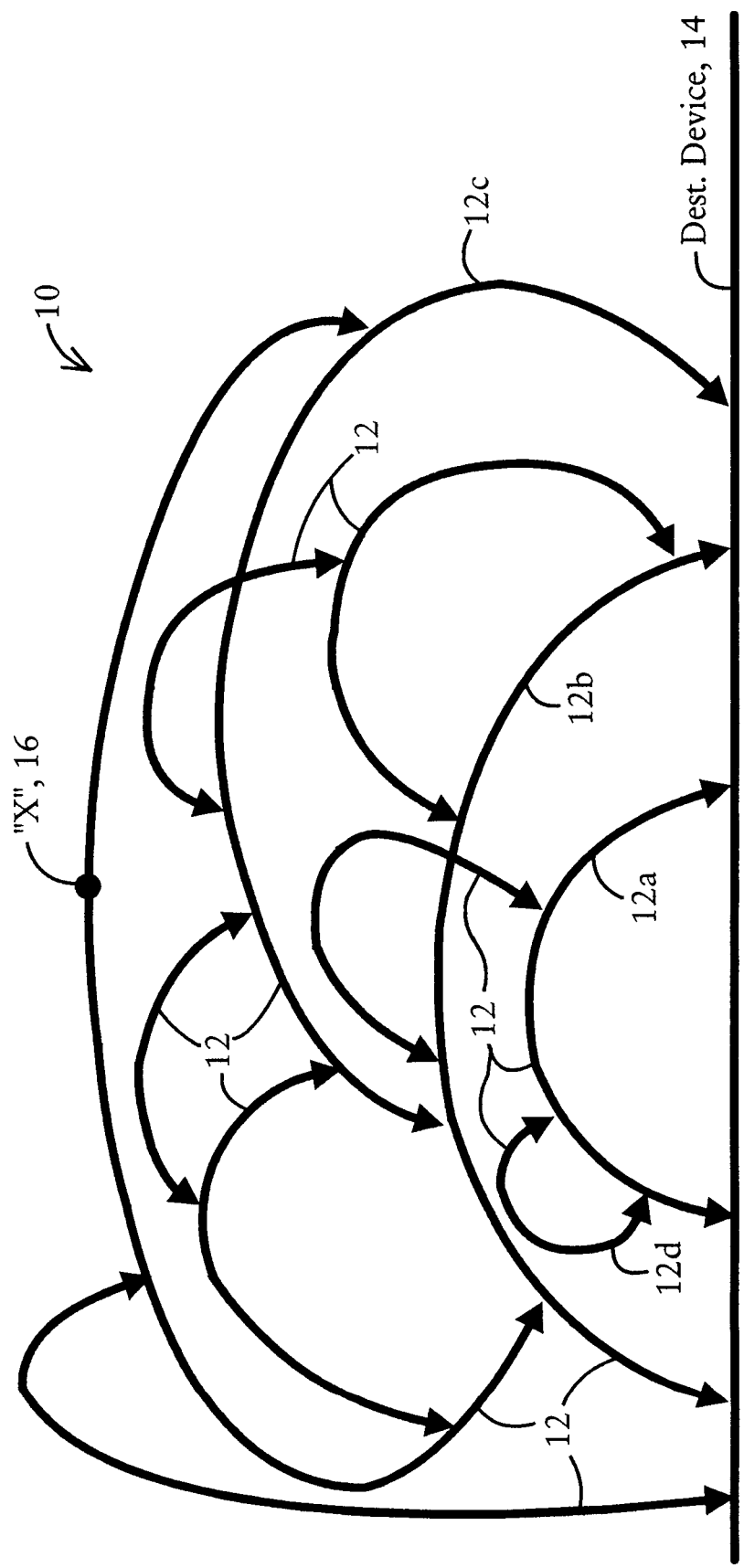
FIG. 1 illustrates an example loop-free routing topology comprising a plurality of routing arcs for reaching a destination device, according to an example embodiment.

In one embodiment, a method comprises creating, in a computing network, a loop-free routing topology for reaching a destination device, the loop-free routing topology comprising a set of distinct paths for reaching the destination device; generating a set of serialized representations describing the loop-free routing topology, each serialized representation describing a corresponding one of the paths; and propagating the set of serialized representations from the destination device to network nodes in the computing network, enabling the network nodes to establish loop-free label switched paths for reaching the destination device via the loop-free routing topology.

In another embodiment, an apparatus comprises a processor circuit and a network interface circuit. The processor circuit is configured for creating, for a computing network, a loop-free routing topology for reaching a destination device, the loop-free routing topology comprising a set of distinct paths for reaching the destination device, the processor circuit further configured for generating a set of serialized representations describing the loop-free routing topology, each serialized representation describing a corresponding one of the paths. The network interface circuit is configured for propagating the set of serialized representations from the destination device to network nodes in the computing network, enabling the network nodes to establish loop-free label switched paths for reaching the destination device via the loop-free routing topology.

DETAILED DESCRIPTION

Particular embodiments enable efficient network traffic management toward a destination device in a loop-free routing topology having distinct paths, such as routing arcs, that enable the network traffic to be routing along any of two ends of any path.

Commonly-assigned, copending U.S. application Ser. No. 13/113,113, filed May 23, 2011, entitled "GENERATING A LOOP-FREE ROUTING TOPOLOGY USING ROUTING ARCS," describes routing arcs in a loop-free routing topology that can guarantee that any network device having at least two data links can reach the destination device via at least one of the routing arcs: the network traffic can be instantaneously rerouted toward another end of a routing arc in response to detected data link failure (or network node failure), based on reversing an identified reversible link within the routing arc. The reversal of the identified reversible link within the routing arc also is guaranteed to not introduce any loops into the loop-free routing topology.

In one embodiment, the loop-free routing topology is represented by generating a set of serialized representations describing the loop-free routing topology. In particular, each serialized representation describes one of the paths (e.g., routing arcs), in the loop-free routing topology; for example a serialized representation of a given path or routing arc can resemble a source route path from one end of the path (e.g., a first junction node of a routing arc) to another end of the path (e.g., a second junction node of a routing arc). Hence, the set of the serialized representations provides a complete representation of all the paths in the loop-free routing topology.

Moreover, any network node receiving the set of serialized representations can establish multiple paths for reaching the destination device, for example in the form of loop-free label switched paths for reaching the destination device. Hence, the propagation of the serialized representations throughout the network nodes in the computing network enables the automatic deployment of label switched paths by the network nodes.

A description will first be provided of the creation of the loop-free routing topology for reaching the destination device, followed by a description of the establishment of loop-free label switched paths by the network nodes.

Generating the Loop-Free Topology Using Routing Arcs

FIGS. 1 through 6I describe the generation of the loop-free topology using routing arcs, according to an example embodiment. In particular, the following description with respect to FIGS. 1 through 6I describe an apparatus creating, in a computing network, a loop-free routing topology comprising a plurality of routing arcs for reaching a destination device: each routing arc comprises a first network device as a first end of the routing arc, a second network device as a second end of the routing arc, and at least a third network device configured for routing any network traffic along the routing arc toward the destination device via any one of the first or second ends of the routing arc.

A junction node is defined as a network node (i.e., a network device identified based on its relative position within a network topology) that has at least two data links providing respective non-congruent paths for reaching the destination device: the term "non-congruent" in this specification and the attached claims requires that the paths from a junction node do not share any common data link for reaching the destination device, rather each link belonging to one path (from the junction node to the destination device) is distinct and independent of any link belonging to the second non-congruent path (from the junction node to the destination device).

A data link of a junction node also can be deemed a "reversible link" if the data link enables an endpoint of the data link (i.e., a network node that is directly coupled to the junction node via the data link) to become a junction node having its own non-congruent paths for reaching the destination device.

In one embodiment, one or more junction nodes coupled by a reversible link can be logically connected in sequence to create a routing arc as a first infrastructure arc having its two corresponding ends terminating at the destination device. Additional routing arcs can be created that have at least one end terminating in a previously-created infrastructure arc (e.g., the first infrastructure arc), and the other end terminating in either a previously-created infrastructure arc or the destination device, where each new routing arc includes network devices that are distinct from any of the network devices in previously-generated routing arcs. In other words, a network device assigned to one existing routing arc cannot later be assigned to another routing arc (except if the network device is a junction between the existing routing arc and an end of the newer routing arc).

In another embodiment, a routing arc can be created as an infrastructure arc based on identifying, within a first directed acyclic graph for reaching the destination device, one or more junction nodes having reversible links for reaching the destination device via non-congruent paths; a second routing arc can be created based on identifying, within the first directed acyclic graph, a second directed acyclic graph for reaching one of the junction nodes (as one end of the second routing arc) of the first directed acyclic graph, and identifying within the second directed acyclic graph a new junction node having a new non-congruent path for reaching the destination device that is distinct from the one junction node, the new junction node providing the new non-congruent path via the second end of the second routing arc that terminates either at the destination device or a previously-created infrastructure routing arc.

Hence, example embodiments enable any network device having two data links in the loop-free routing topology to be guaranteed reachability to the destination device, even if any one data link in the loop-free routing topology encounters a failure, based on reversing an identified reversible link.

FIG. 1 illustrates an example loop-free routing topology 10 comprising a plurality of routing arcs 12 for reaching a destination device 14, according to an example embodiment. Each routing arc 12 comprises a plurality of network devices 16 each having at least two data links for reaching adjacent network nodes. As apparent from FIG. 1, the loop-free routing topology 10 guarantees that any network device 16 along any point of any arc 12 (illustrated by "X" in FIG. 1) has at least two non-congruent paths for reaching the destination device 14, guaranteeing reachability to the destination device 14 even if a link failure is encountered in the loop-free routing topology 10. The term "node" in the specification and claims refers to a network device (i.e., apparatus, machine, etc.) that is assigned an identifiable position within the routing topology 10. Hence, the destination device 14 also can be referred to as a "destination node", "destination network node" or a "root node", and any network device (e.g., 16 of FIG. 2, 6A, 6B, or 6I) 16 also can be referred to as a "network node".

As described in further detail below with respect to FIGS. 6A-6I, each routing arc (e.g., "ARC1" of FIG. 6I) 12 comprises at least three network nodes 16, namely a first network device (e.g., network node "K" of FIG. 6I) 16 designated as a first end of the routing arc, a second network device (e.g., network node "J" of FIG. 6I) 16 designated as a second end of the routing arc, and at least a third network device (e.g., network node "M" of FIG. 6I) 16 identified as a junction node and configured for routing any network traffic along the routing arc toward the destination device 14 via any one of two available non-congruent paths provided by the first or second ends of the routing arc. Hence, network traffic can be forwarded along at least one of the routing arcs 12 to the destination device 14.

Figure 6A:
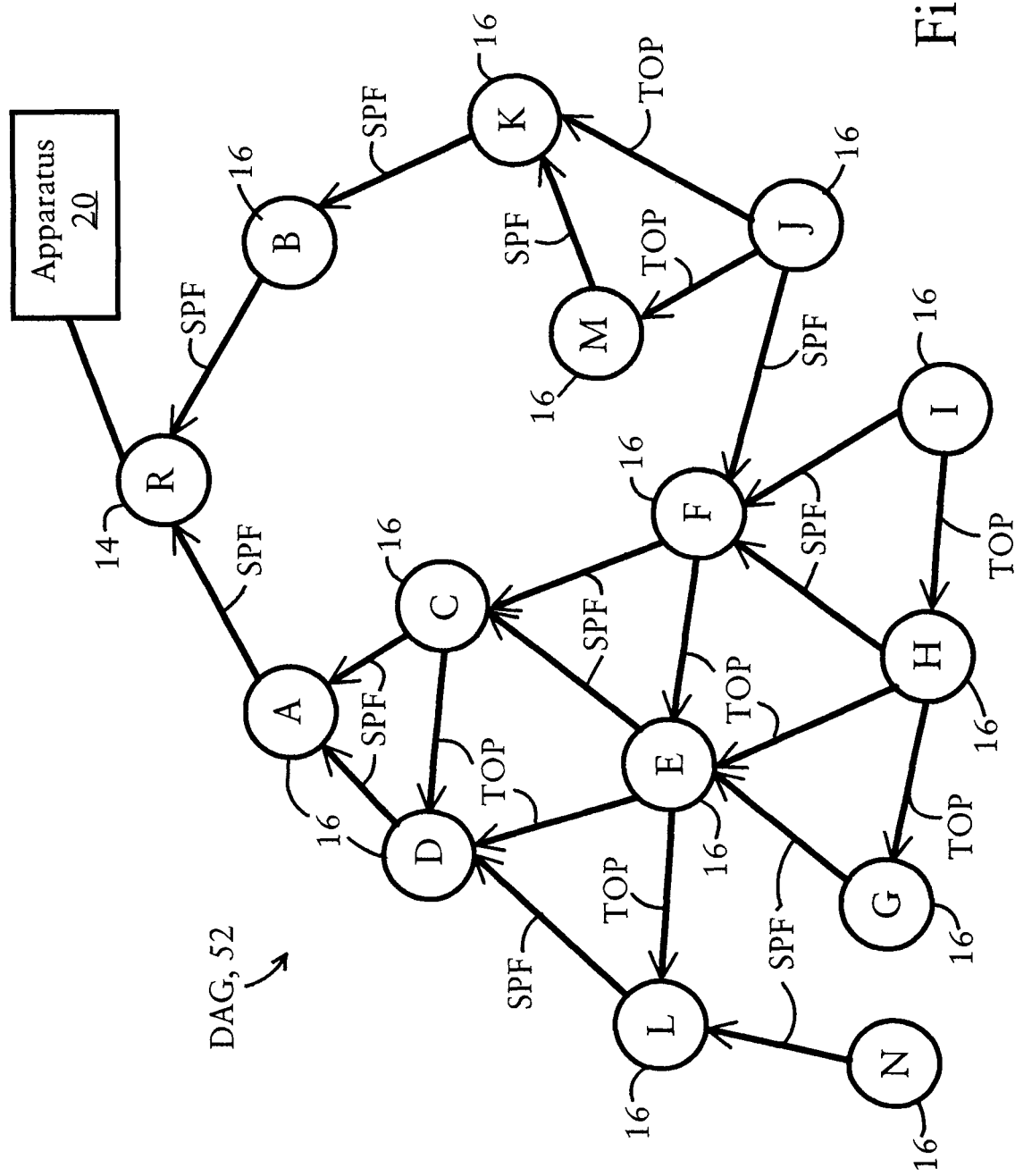
FIGS. 6A-6I illustrate an example sequence of constructing, from the link layer network of FIG. 2, the loop-free routing topology having a plurality of paths (e.g., routing arcs), according to an example embodiment.
Figure 6B:
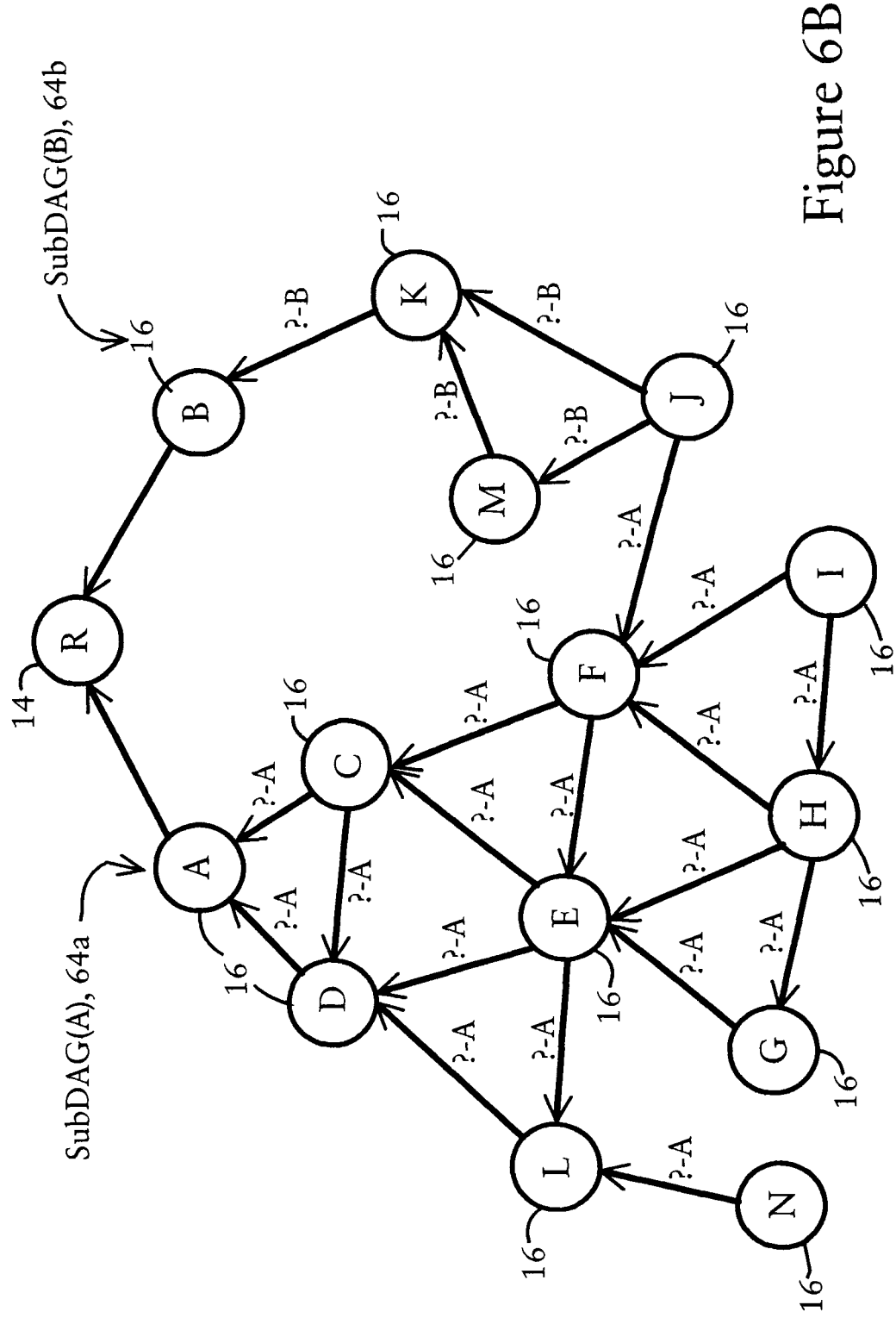
Figure 6C:
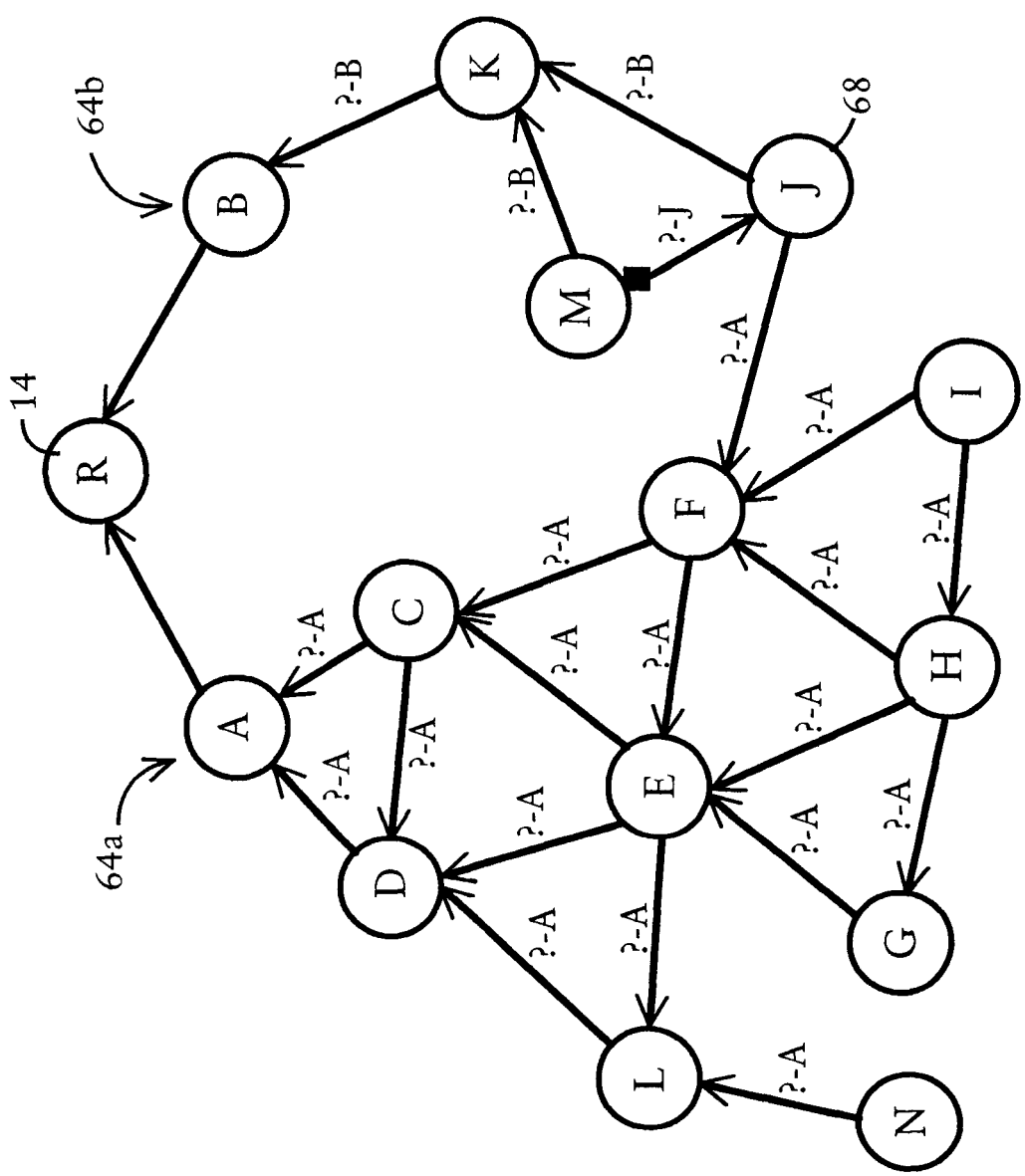
Figure 6D:
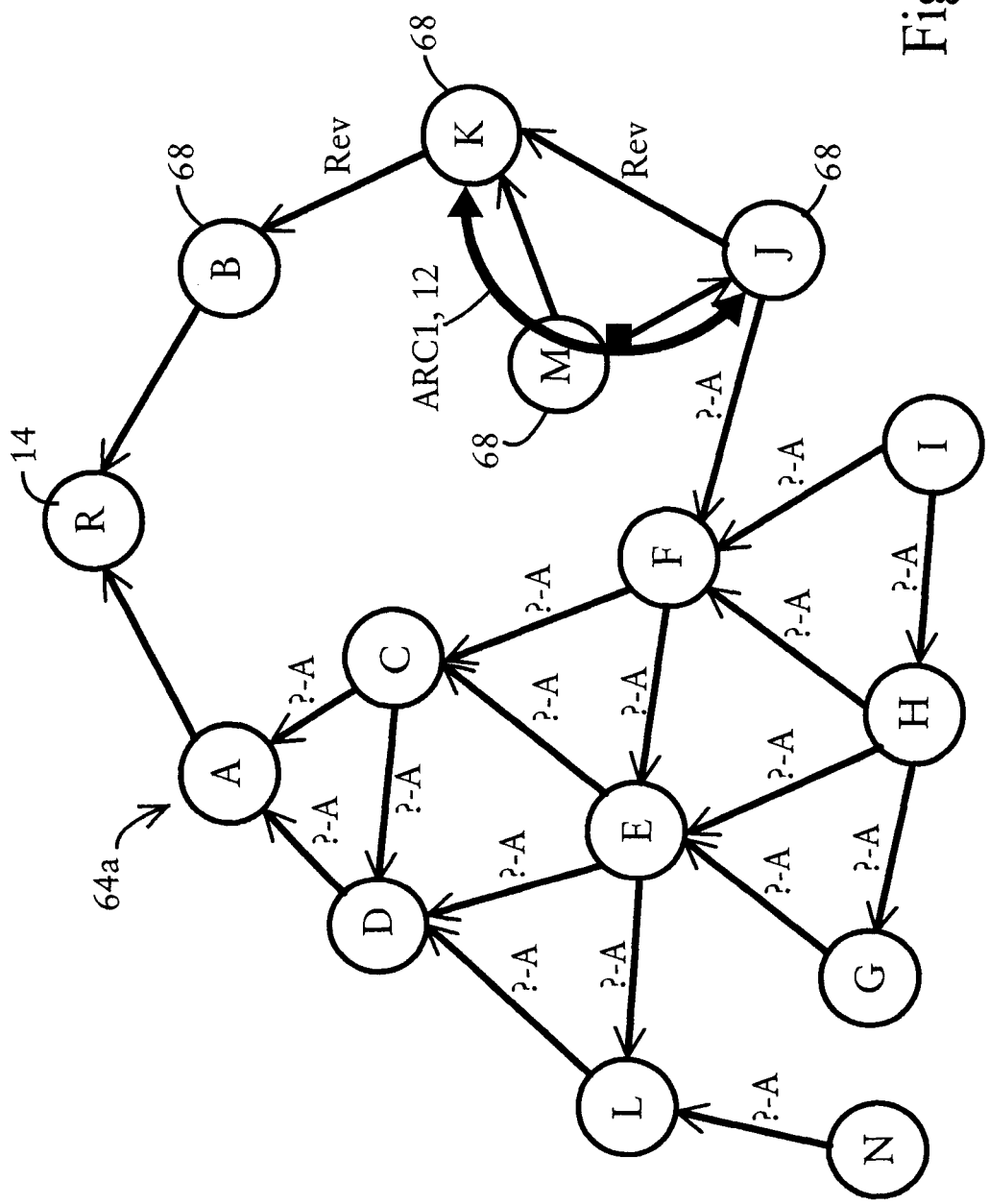
Figure 6E:
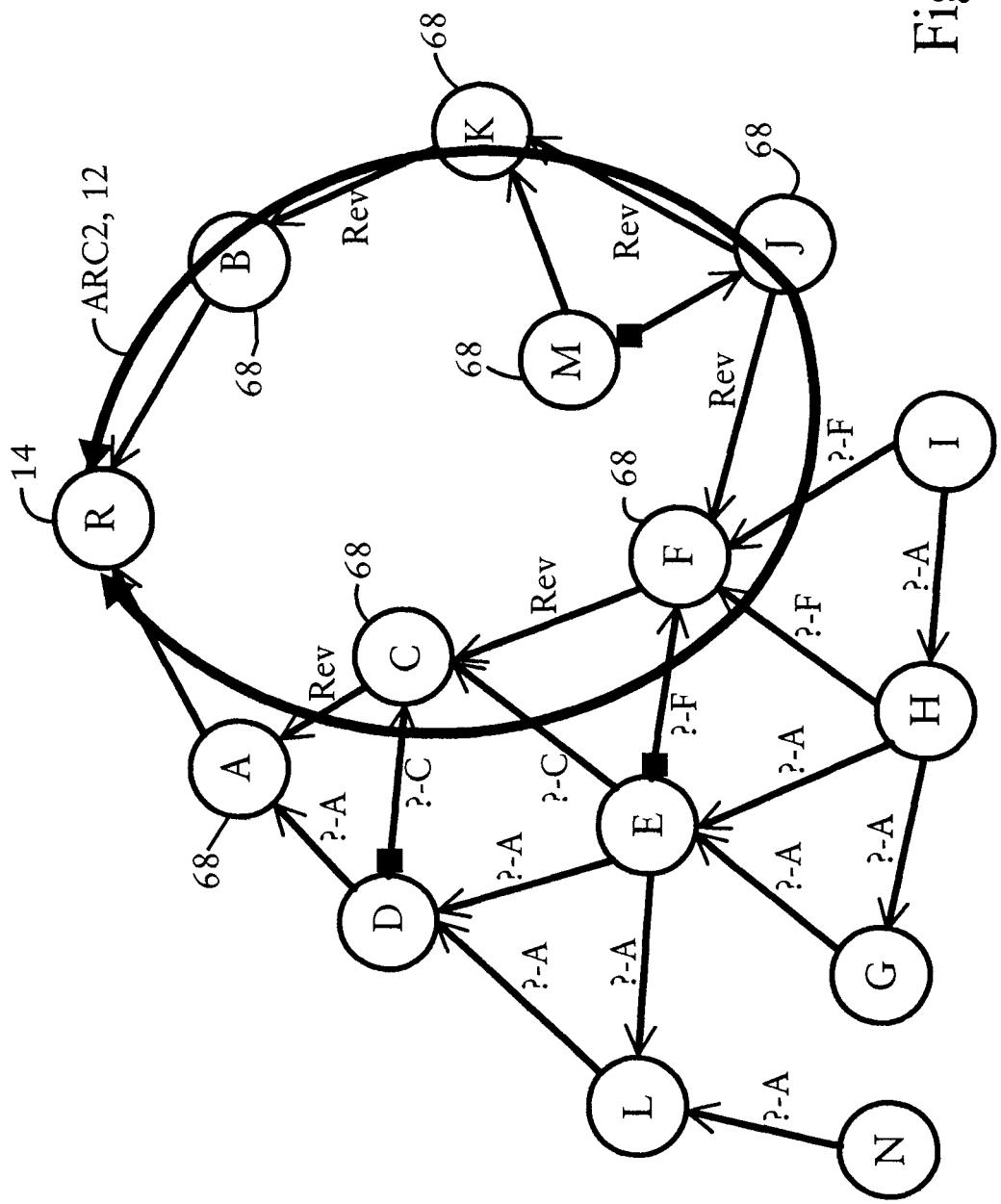
Figure 6F:
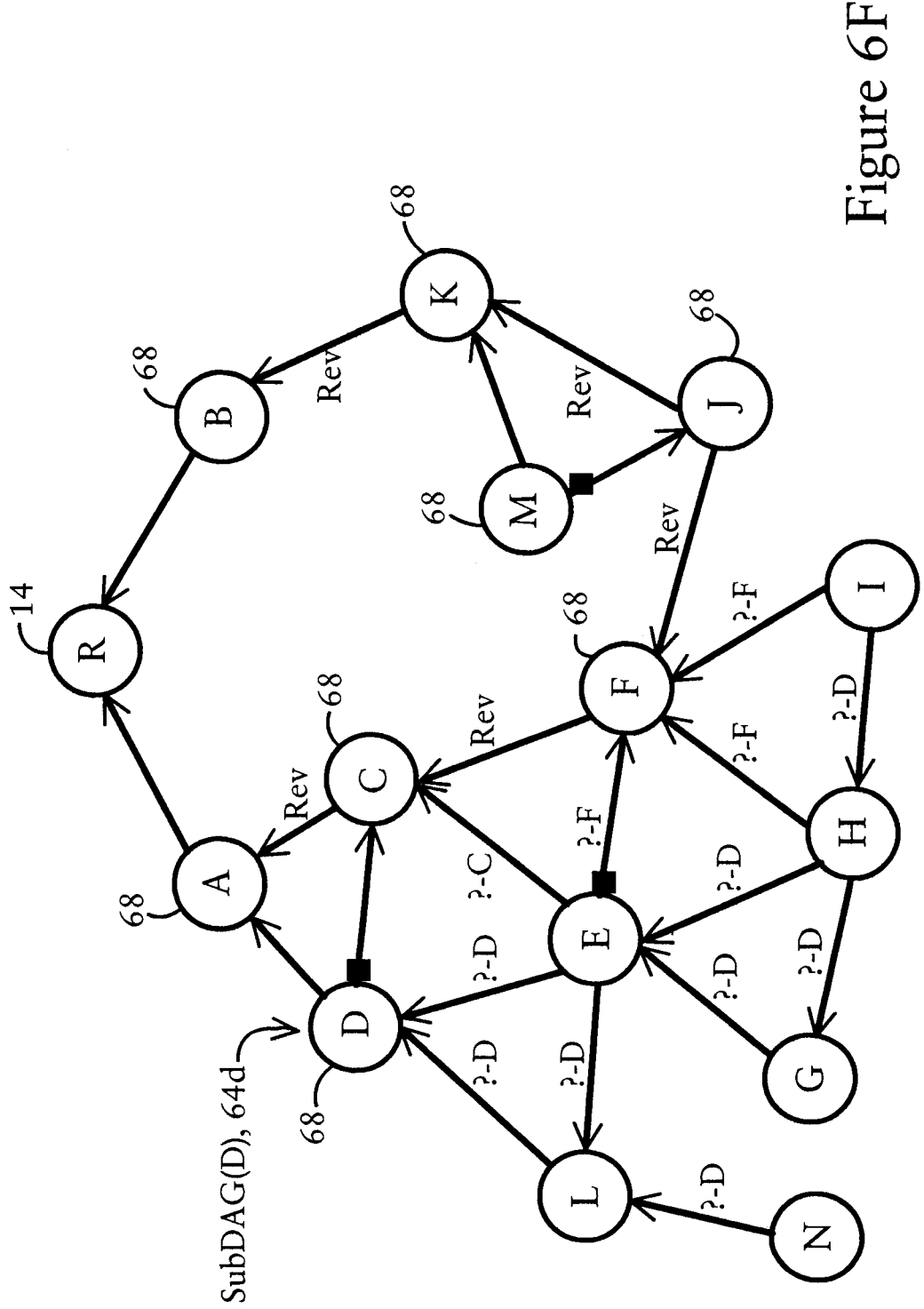
Figure 6G:
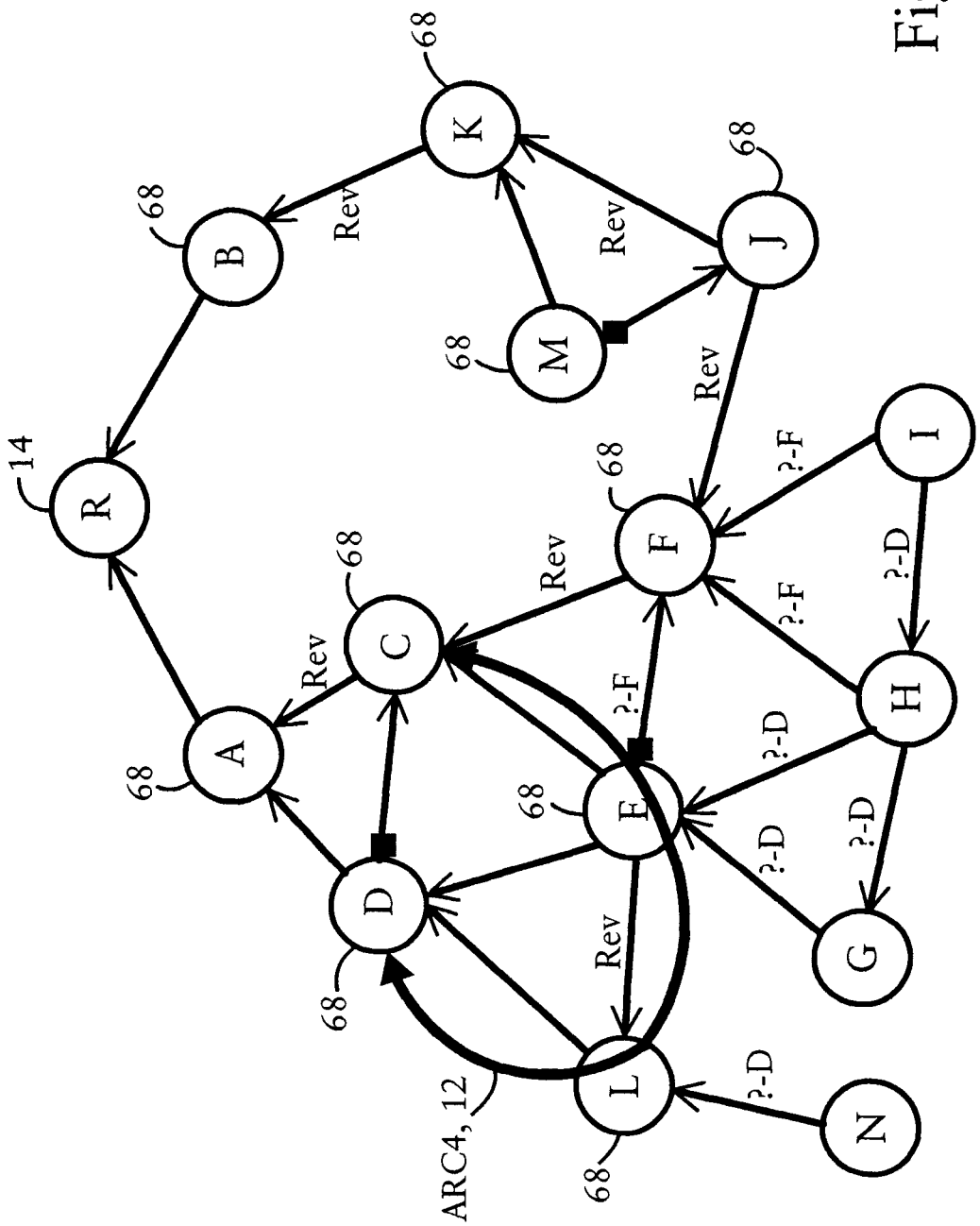
Figure 6H:
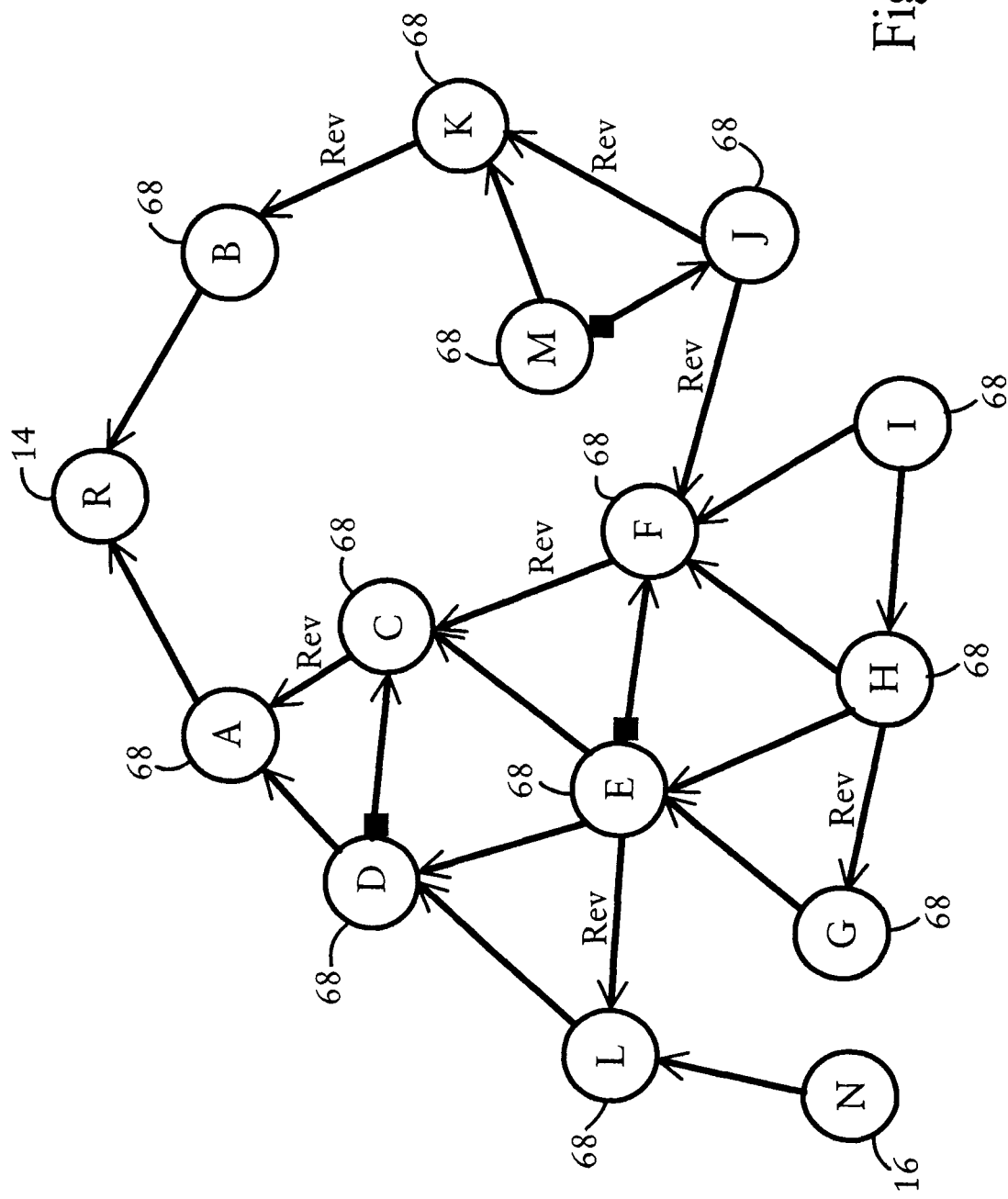
Figure 6I:
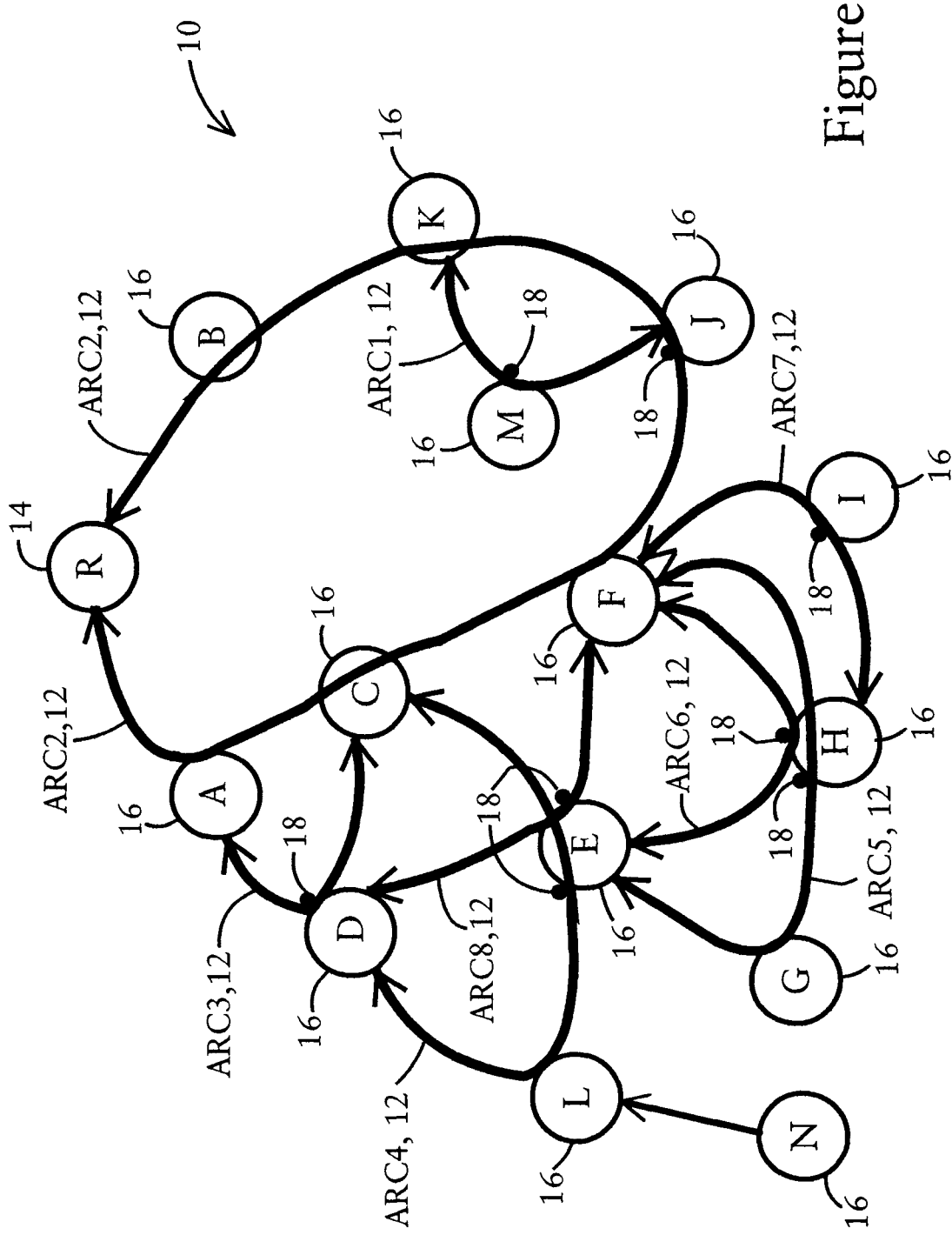

As illustrated in FIG. 6I, the first and second ends of each routing arc 12 each terminate at a "safe network node", for example either the destination device 14, another network node directly coupled to the destination device (e.g., network node "A" or network node "B"), or a junction node of another routing arc. A network node (e.g., "A" of FIG. 6I) directly coupled to the destination device "R" 14 is referred to as an "heir network node". Hence, a "safe network node" can be any one of the destination device 14, an heir network node (e.g., "A" or "B" of FIG. 6I), or a junction node having two non-congruent paths for reaching the destination device. For example, both ends of the routing arc "ARC2" 12 terminate at the destination device "R" 14, also referred to as the "root network node" or "root node"; a first end of the routing arc "ARC3" 12 terminates at the heir network node "A" 16, and a second end of the routing arc "ARC3" 12 terminates at the junction node "C" of the routing arc "ARC2" 12. The routing arc "ARC2" 12 also can be referred to as the "root arc", since both ends of the routing arc "ARC2" 12 terminate at the destination device "R" 14

In an example embodiment illustrated in FIG. 5 and FIG. 6I, each routing arc comprises one and only one arc cursor (18 of FIG. 6I) that provides exclusive control of directing the network traffic along the routing arc. One and only one junction node of the routing arc (i.e., one and only one network device assigned a position within the routing arc as a junction node) has possession of the arc cursor 18 at any given time: the junction node having possession of the arc cursor 18 can control the network traffic along the corresponding routing arc 12 based on possession of the arc cursor 18. In particular, the junction node (e.g., "J" of FIG. 6I) having possession of the arc cursor 18 can direct network traffic away from itself along either of its outwardly-oriented links toward the ends of the routing arc (e.g., "ARC2") 12. Hence, a junction node having possession of the arc cursor 18 (also referred to as an "arc cursor node") has exclusive control over routing the network traffic along the corresponding routing arc, based on the junction node routing the network traffic away from itself along one of its outwardly-oriented links.

A second junction node (i.e., another network device a position within the routing arc as a junction node) can gain possession of the arc cursor (e.g., from the first junction node of the routing arc) based on a detected failure in the corresponding routing arc, for continued routing of the network traffic in the corresponding routing arc despite the detected failure. For example, the junction node "F" of the routing arc "ARC2" 12 can gain possession of the corresponding arc cursor 18 that was previously owned by the junction node "J", based on a detected failure in the link "F-C" between network nodes "F" and network node "C", enabling the network node "F" to reverse the link "F-J" toward the node "J" for continued reachability toward the destination device "R" 14 (see FIGS. 6H and 6I). Hence, the second junction node (e.g., "F" of FIGS. 6H and 6I), upon gaining possession of the arc cursor 18 that provides exclusive control of directing the network traffic along the routing arc (e.g., "ARC2") 12, can reverse one of the connected reversible links without creating a loop in the loop-free routing topology 10. Hence, data traffic along a routing arc (e.g., "ARC2") 12 can be instantaneously rerouted for continued routing in the routing arc 12 toward the destination device 14 in response to a detected failure in the routing arc (e.g., failure in link "F-C"), based on a junction node (e.g., "F") in the routing arc gaining possession of the routing arc 18 previously owned by another junction node (e.g., "J") in the same routing arc 12.

Figure 2:
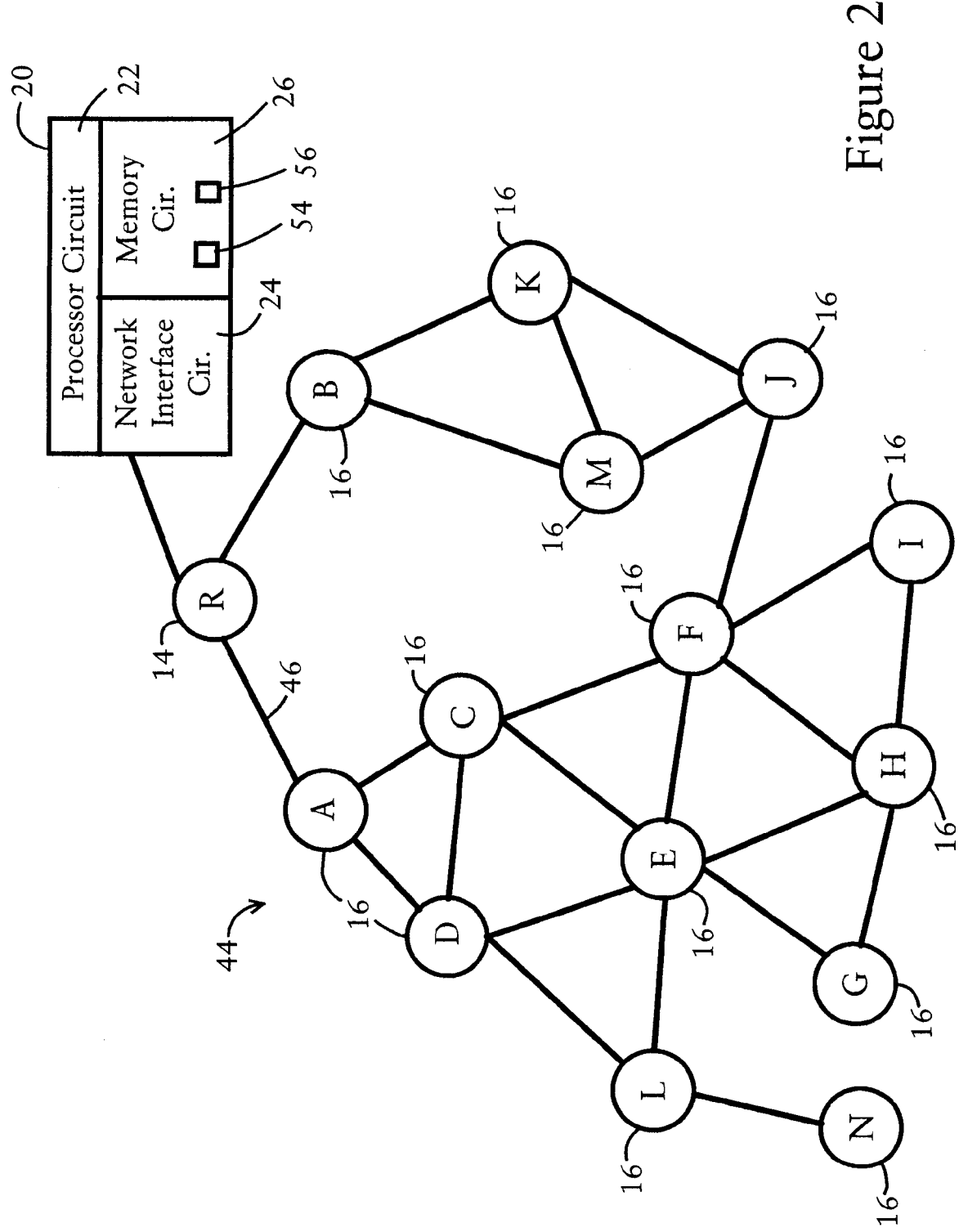
FIG. 2 illustrates an example apparatus for creating a loop-free routing topology in a link layer network of network devices coupled by data links, according to an example embodiment.

FIGS. 2 and 6A illustrate an example apparatus 20 for creating the loop-free routing topology 10 of FIGS. 1 and 6I, according to an example embodiment. The apparatus (i.e., device, machine) can be implemented as a router, a centralized server, a network management entity, etc. that executes the disclosed operations for creating the loop-free routing topology 10, and distributing relevant routing arc parameters to each of the network devices implementing the loop-free routing topology 10 as network nodes 16 within the topology 10. The apparatus 20 is a physical machine (i.e., a hardware device) configured for implementing network communications with other physical machines 14, 16 via data links establishing a link layer mesh topology network 44 (see FIG. 2).

As illustrated in FIG. 2, the apparatus 20 includes a processor circuit 22, a device interface circuit 24, and a memory circuit 26. The processor circuit 22 is configured for creating, for a computing network, the loop-free routing topology 10 comprising the routing arcs 12 for reaching the destination device 14. The memory circuit 26 is configured for storing parameters associated with the routing arcs 12 in a state table 54 and/or a topology table 56, described in further detail below with respect to FIGS. 4 and 5. The device interface circuit 24 is configured for outputting at least selected parameters associated with the routing arcs 12 to a second apparatus, for deployment of the loop-free routing topology 10: the second apparatus can be a network management entity for configuring the network nodes 16, or at least one of the network nodes 16 that can be configured directly by the apparatus 20. Hence, the output by the device interface circuit 24 of the selected parameters for deployment of the loop-free routing topology 10 causing the network traffic in the computing network to be forwarded along at least one of the routing arcs to the destination device.

Any of the disclosed circuits of the apparatus 20 (including the processor circuit 22, the device interface circuit 24, the memory circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 26) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 26 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

The following definitions are provided prior to a description of the methods for creating the routing arcs.

A routing arc is defined as a double ended reversible path. A reversible arc is defined as a routing arc containing one or more reversible links, and the reversible arc can contain one or more non-reversible links at each end of the arc. Data links that are labeled "Rev" in FIGS. 6B through 6H are reversible links, and links that are not labeled "Rev" in FIGS. 6B through 6H are not reversible; hence, the end of a routing arc can be identified based on one or more successive non-reversible links, with one or more reversible links internal to the non-reversible links. A collapsed arc (e.g., "ARC1", "ARC3", "ARC6", "ARC7", and "ARC8" of FIG. 6I) is defined as a routing arc 12 having no reversible link and consisting of a one network node that has fixed (i.e., non-transferable) possession of the arc cursor 18, and two other network nodes 16 nodes serving as respective ends of the collapsed arc. For example, the collapsed arc "ARC1" 12 is illustrated in FIG. 5 and FIG. 6I as consisting of the network nodes "J", "M", and "K", where the network node "M" has fixed possession of the arc cursor 18 between the network nodes "J" and "K" at the respective ends of the collapsed arc "ARC1" 12.

A link designated with an arrow at one end and having a designation of "SPF" represents a link as found in a tree generated according to a conventional routing protocol such as Open Shortest Path First (OSPF), such that the network node at the end of the arrow represents a shortest path first (SPF) successor of the network node at the tail end of the arrow (e.g., network node "A" in FIG. 6A is the SPF successor to network nodes "C" and "D"). Any link at the edge of the arc (i.e., that terminates the arc and connects the arc either to a second arc or to the destination) will be designated using the arrow at one end. A link designated with "TOP" (representing "then other path") represents a link that has not been chosen by OSPF because it is not the shortest path successor, but that can be used as an alternate next hop (i.e., a feasible successor), for example for generating a directed acyclic graph (DAG) (see, e.g., U.S. Pat. No. 7,656,857).

As described previously, the network device having possession of the arc cursor can decide in which direction along the arc network traffic should be forwarded. Hence, a network node is determined to be a "safe network node" if the "safe network node" can forward network traffic in either direction along the arc (i.e., the "safe network node" can safely forward any packet in one direction along the arc even if the other direction fails).

A link designated with the reference "?-S" represents a candidate link that is unresolved for a junction node "S" that is identified as the nearest safe network node for the network node via the link having the designation "?-S": reference to a candidate link denotes a transient state when the two ends of a routing arc have not yet been established, and it is not yet established whether the candidate link is to be used in the formation of a routing arc. As described in further detail below with respect to FIGS. 6B-6F, the links designated with the reference "?-S" also identify a subDAG (i.e., a DAG within a DAG) for reaching the safe node "S".

A link designated with the reference "Rev" indicates a reversible link connecting two network devices (i.e., network nodes) that are within a routing arc 12: as illustrated in FIGS. 6H and 6I, a network node (e.g., "J") having at least one reversible link is within the middle of the arc, and can have possession of the arc cursor 18 for the corresponding routing arc. As illustrated in FIGS. 6H and 6I, data links at the edge of a routing arc (e.g., that terminates at a first arc and enters into a second arc, or that terminates at the destination node D) are directed away from the middle of the routing arc (and the junction node having possession of the corresponding arc cursor 18) 12, and the data links at the edge of a routing arc 12 are not reversible.

A link designated with a square-shaped or diamond-shaped block at one end (e.g., "M□→J" in FIG. 6C) indicates a blocked link that is not reversible, where the destination network node (e.g., network node "J" in FIG. 6C) cannot send any data traffic to the other sourcing network node (e.g., "M" of FIG. 6C), but the sourcing network node (e.g., "M" of FIG. 6C) can send data traffic to the destination network node ("J") via the link ("M□→J"). Blocked links are used during computation to prevent any formation of loops.

As described in further detail below, data links are oriented away from the junction node having possession of the arc cursor toward the edges of the routing arc 12, and link orientation of a reversible link can be changed by moving the arc cursor 18 (i.e., passing ownership of the cursor from one network node to another network node).

Routing arcs 12 are built between network nodes identified as junction nodes. A junction node 68 is a network node connected to two or more safe network nodes (described below) over non-congruent paths (i.e., no single point of failure can stop reachability from the junction node to the root node). An edge junction is defined as a junction node 68 terminating one and only one reversible link, where the edge junction can have multiple nonreversible links oriented both inwards and/or outwards. An intermediate junction is defined as a junction node 68 that terminates two and only two reversible links, where all other links coupled to the intermediate junction are oriented inwards to avoid loops: a link can be safely reversed towards an intermediate junction. Hence, an intermediate junction consists of two reversible links and zero or more inward oriented links from any other network node. A collapsed arc does not have any intermediate junction, and an edge junction can belong to one or more collapsed arcs.

A root network node 14 is defined as a single network node in a network (i.e., a "destination device") that must be accessed to reach a resource, i.e., there never can be a second path that can bypass the root network node to reach the resource. Calculation of routing arcs 12 begins with identification of a root node (i.e., the destination node) 14 for a given routing topology 10. Examples of a root node 14 can include a head end of an autonomous directed acyclic graph within the routing arcs 12, a gateway to another network, or any identifiable destination. All of the root links always are oriented inwards toward the root node 14 and resolved.

An "heir" network node is a network node that is directly connected to a root network node 14. As illustrated in FIGS. 1 and 6A-6I, a destination device serving as a root network node 14 must have at least two heir network nodes (e.g. network nodes "A" and "B" of FIGS. 6A-6I) that are directly connected to a root network node 14: if a root network node has only one heir node, then the heir network node is designated as the new root node (based on the definition of a root network node as having no second path to reach a resource). The heir network node is used to identify a safe network node: if a network node can reach the root node alternatively via either a first heir network node or a second heir network node, then the network node is considered a safe network node because it can route a packet to the root via two non-congruent paths, namely either via the first heir network node or via the second heir network node, guaranteeing that reachability if one of the links toward the root node is broken.

A leaf network node is a node that has one and only one data link: a leaf node cannot be a junction node and cannot belong to a routing arc 12. The data link coupled to the leaf network node is always oriented outwards (i.e., away from the leaf network node) and resolved.

A safe network node is a designation used to identify any one of a root network node 14, an heir node (e.g., "A" or "B" of FIGS. 6A-6I), or a junction node. Hence, a junction node is a network node that is neither a root network node 14 nor an heir network node, but that is a safe network node because it has two or more non-congruent paths to the root network node such that no single point of failure can cut off the junction node from the root network node. A network node can be identified as a junction node if the direction of a reversible link must be turned to obtain the alternate path.

Hence, a network node connected to an heir network node and the root network node is a junction node; a network node connected to two different heir network nodes is a junction node; a network node connected to an heir network node and a junction node also is a junction node; a network node connected to two different junction nodes also is a junction node. Since the root network node, the heir network node, and the junction node each are defined as safe network nodes, then a network node connected to two different safe network nodes is a junction node; a network node that has non-congruent paths to at least two different safe network nodes is a junction node (the junction node can be considered to "see" to safe network nodes, and then hide them so long as they are only reachable from via that junction node); a network node that can only see one junction node is within the "subDAG" that junction node and can be tracked as such.

Hence, a data packet must follow along a routing arc 12, and can exit a routing arc 12 only via an edge junction at one of the ends of the routing arc 12. Consequently, a data packet can reach the root node (i.e., the destination node) 14 based on traveling along one or more routing arcs 12.

Figure 3A:
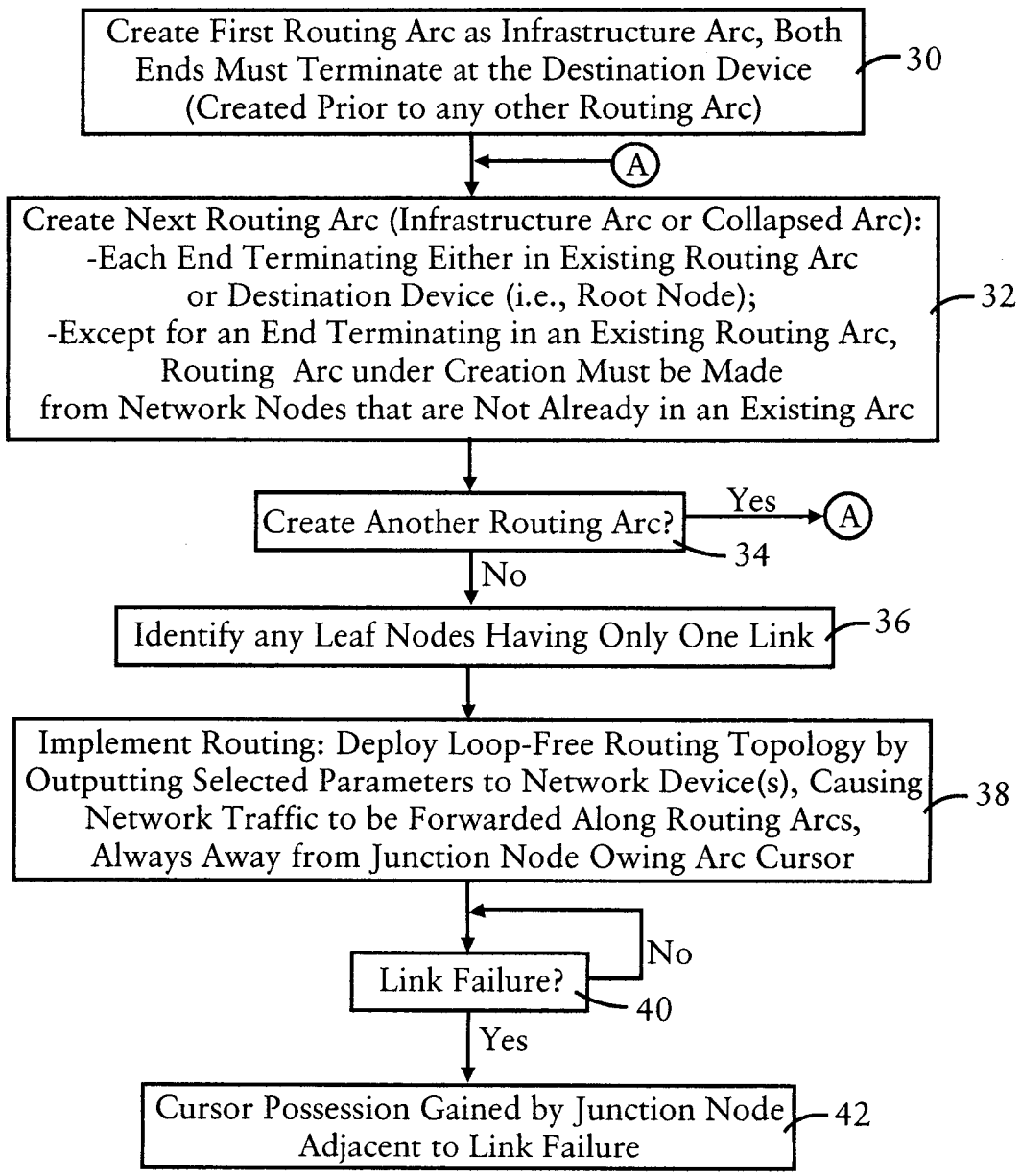
Figure 3B:
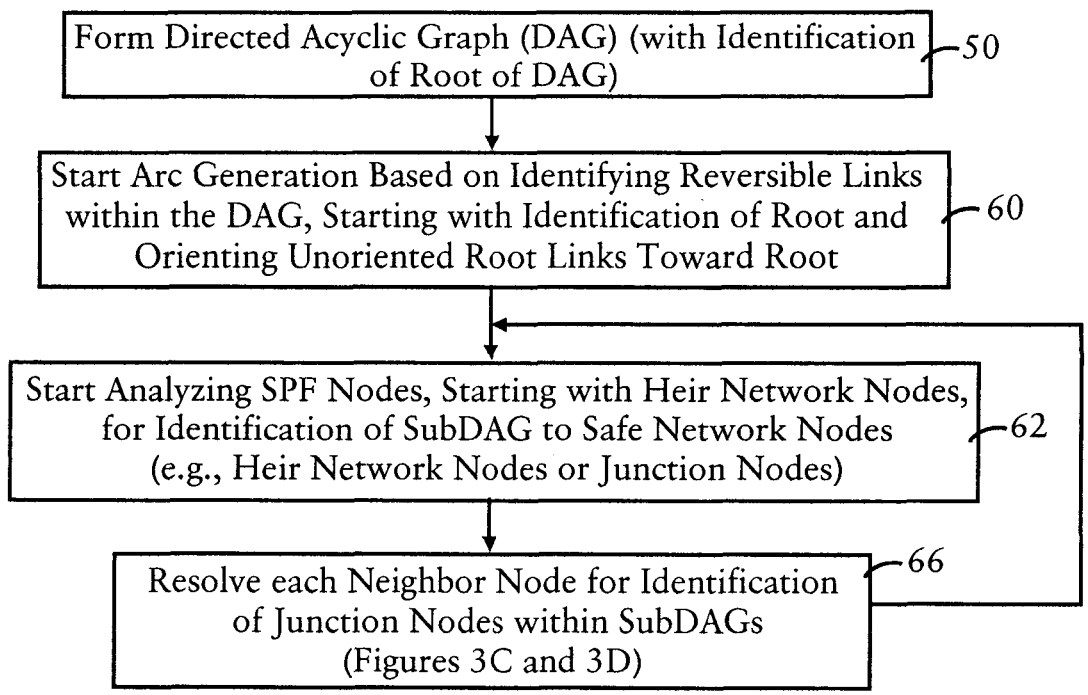
Figure 3D:
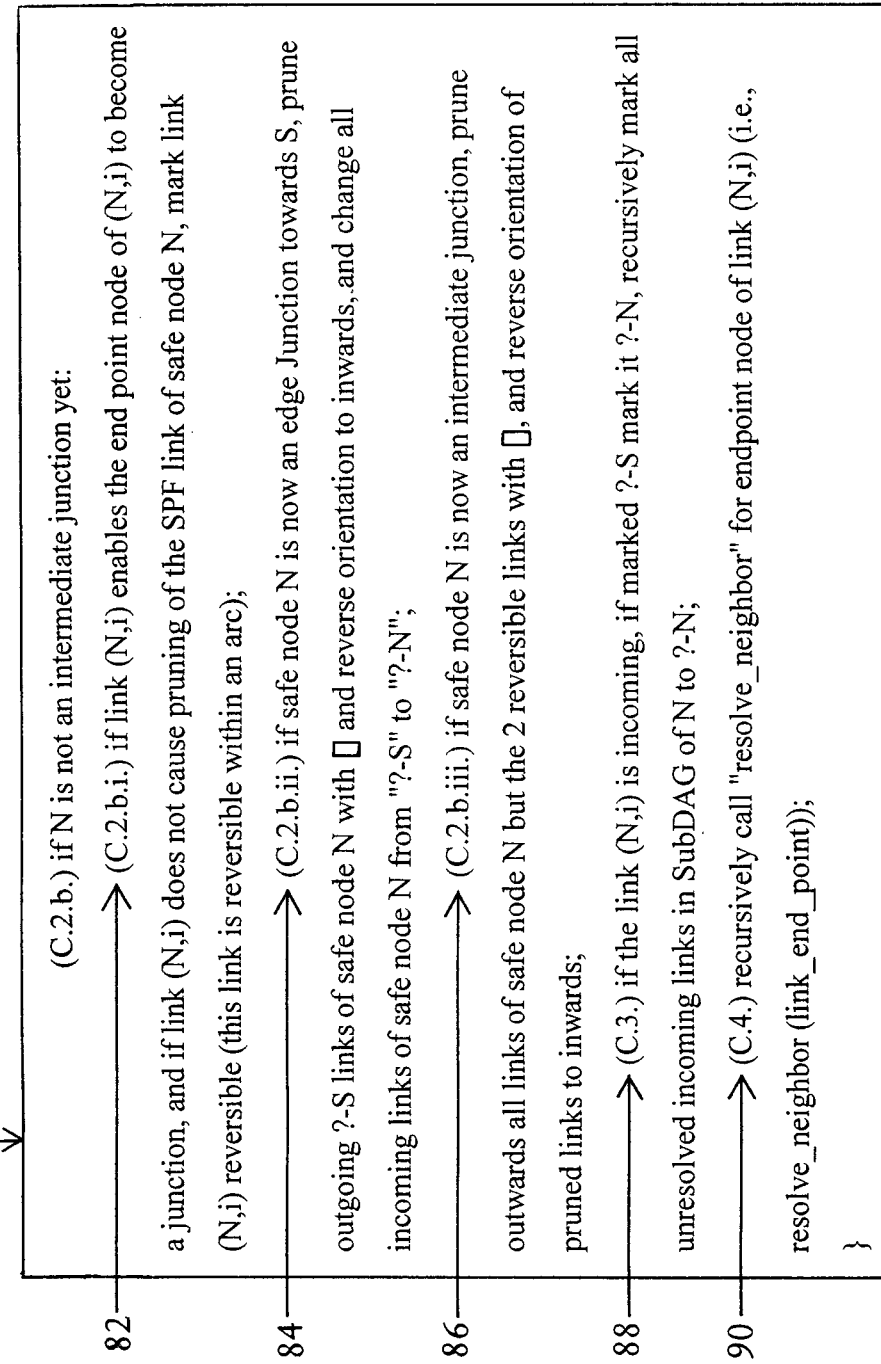

FIG. 3A is a diagram illustrating an example method by the apparatus 20 of FIG. 2 that includes creating a loop-free routing topology 10 comprising routing arcs 12 for reaching a destination device 14, according to an example embodiment. FIGS. 3B, 3C and 3D illustrate an alternate method by the apparatus 20 for creating the loop-free routing topology 10, according to another example embodiment. The steps described in FIGS. 3A-3D (and FIGS. 8-11 and 13, described below) can be implemented as executable code stored on a computer or machine readable non-transitory tangible storage medium (e.g., floppy disk, hard disk, ROM, EPROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 3A, the processor circuit 22 can create the loop-free routing topology 10 based on creating in step 30 the first routing arc 12 as an infrastructure arc (i.e., a routing arc that is not a collapsed arc): the first routing arc 12 (e.g., 12a or 12b of FIG. 1) created in step 30 must have both ends terminating at the destination device (i.e., the root node) 14. The processor circuit 22 can create in step 32 the next routing arc 12 (after the first routing arc 12a or 12b created in step 30) as an infrastructure arc (e.g., 12c after 12b) or a collapsed arc (e.g., 12d after 12a), subject to the following rules: (1) the next routing arc 12 under construction must terminate either in the junction node of an existing routing arc or at the destination device 14 (e.g., routing arc 12c terminates one end at the routing arc 12b and terminates the other end at the destination device 14); and (2) except for an end of a routing arc terminating in the junction node of an existing routing arc, the routing arc under creation must be made from network nodes that are not already in an existing routing arc; in other words, in rule (2) the next routing arc 12 includes network devices that are distinct from any of the network devices of the existing routing arcs. The next routing arc 12 can be constructed by the processor circuit 22 in step 34, until all the routing arcs have been completed for all network nodes having at least two data links. The processor circuit 22 identifies in step 36 any leaf network nodes consisting of only one data link, and implements in step 38 the loop-free routing topology 10 constructed in steps 30, 32, 34, and 36.

As illustrated steps 30, 32, and 34, the first routing arc 12 (e.g., 12a or 12b) preferably is created prior to any other routing arc 12 (e.g., 12c or 12d); however, the routing arcs 12 in FIG. 1 can be created in any arbitrary order, so long as the rules of step 32 are followed to guarantee no loop formation, where the "existing routing arc" refers to a set of network nodes that already are allocated for another routing arc. Hence, alternative techniques for creating the loop-free routing topology 10 can be utilized, so long as: the routing arcs 12 do not intersect across each other during formation; or any routing arcs 12 that intersect across each other share the same cursor at the intersection point (e.g., a collapsed arc), causing all network traffic to be directed away from the cursor point.

The processor circuit 22 can deploy in step 38 the loop-free routing topology 10 based on causing the device interface circuit 24 to output at least selected parameters associated with the routing arcs 12 to at least one other apparatus (e.g., a network router, a network management apparatus, one or more network nodes, etc.), causing the network traffic in the routing topology 10 to be forwarded along at least one of the routing arcs 12 to the destination device 14. If in step 40 a link failure is detected (or a network node failure) in one of the routing arcs, for example by either the apparatus 20 or by one of the network nodes 14 or 16, the possession of the arc cursor 18 can be gained (e.g., by transfer, reassignment, etc. by the processor circuit 22) by the junction node adjacent to the link failure in step 42, enabling the junction node to control the network traffic based on reversing one of the reversible links for continued routing toward the destination device 14 without creating a loop in the loop-free routing topology 10.

FIGS. 3B, 3C and 3D illustrate an example method by the processor circuit 22 for creating the loop-free routing topology 10 comprising the routing arcs 12 of FIG. 6I, according to an example embodiment.

According to an example embodiment, a loop-free routing topology 10 can be created in which an attempt is made to establish every network node, except the root network node and the heir network nodes, as junction nodes, in order to guarantee that every network node has a shortest path and an alternate path to a destination device (i.e., the root network node) 14. This guarantee is established by creating routing arcs 12 that terminate at safe network nodes. Since conventional techniques for generating a directed acyclic graph (DAG) does not guarantee that every node within a directed acyclic graph can be a junction, the example embodiments enable a link to be reversed in response to a detected failure in a network node or network link, enabling immediate rerouting of data traffic without route recalculation and without the formation of any loop in the topology. Hence, the example embodiment can establish a loop-free routing topology of routing arcs for reaching a root network node, the loop-free routing topology consisting of a root network node, two or more heir network nodes coupled to the root network node, junction nodes, and zero or more leaf network nodes.

As described in further detail with respect to FIGS. 3B, 3C, 4-5 and 6A-6I, the loop-free routing topology 10 is created based on: generating a first directed acyclic graph for reaching the destination device 14; identifying (within the first directed acyclic graph) junction nodes that have non-congruent paths for reaching the destination device 14; identifying reversible links between the junction nodes, along the non-congruent paths, and that do not introduce or create a loop in the loop-free routing topology 10; and identifying at least one second directed acyclic graph within the first directed acyclic graph (also referred to as a "subDAG") for reaching one of the junction node, the second directed acyclic graph including an identified new junction node having a new non-congruent path for reaching the destination device.

In this disclosure, links can be identified by the connecting network nodes, such that the link "A-R" refers to a wired or wireless link that connects the network node "A" to the next hop network node "R": an arrow in a link designation can refer to an assigned direction (e.g., "A→R" and "R←A" equivalently identify a link directing traffic from node A to node R), whereas the absence of an arrow in a link designation (e.g., "A-R") indicates that a direction has not yet been assigned to the link.

Referring to FIGS. 2 and 3B, the processor circuit 22 identifies the data link layer topology 44 (FIG. 2) composed of wired or wireless data links (e.g., wired or wireless IEEE 802.11, Bluetooth, etc.) 46, and creates in step 50 a directed acyclic graph (DAG) 52 for reaching the destination device 14, illustrated in FIG. 6A. In particular, the link layer topology 44 of FIG. 2 includes network nodes 14 having one or more link layer connections (e.g., wired or wireless IEEE 802 links, Bluetooth links, etc.) interconnecting the network nodes, for example in the form of a link layer (i.e., OSI Layer 2) mesh of interconnected network nodes. The directed acyclic graph 52 is generated in step 50 by the processor circuit 22, for example according to the techniques described in U.S. Pat. No. 7,656,857, where the links labeled "SPF" identify the Shortest Path First (SPF) links in the SPF topology, and the links labeled "TOP" identify the "then other path" (TOP) links overlying the SPF topology that result in the formation of the directed acyclic graph (DAG) toward the root node "R". In summary, the directed acyclic graph is formed by the processor circuit 22 in step 50 based on identifying next hop nodes adjacent to the root node 14, and orienting the link of each next hop node toward the root. Secondary adjacent nodes (adjacent to each of the next hop nodes) are then identified, and the paths from the next hop nodes to the associated secondary adjacent nodes are extended while orienting each of the links between the secondary adjacent nodes and the next hop nodes toward the next hop nodes. These steps are repeated recursively until the paths extend to the furthest nodes in the network, and orienting the links back toward the root, for formation of the directed acyclic graph.

The SPF status of the SPF links are retained in the memory circuit 26 during calculation of the routing arcs 12 with respect to FIGS. 6A-6I. FIG. 4 (consisting of FIGS. 4A, 4B, 4C and 4D) illustrate an example state table 54 that can be stored in the memory circuit 26 and configured for storing state changes in the network nodes and the data links during execution of the method in FIGS. 3B, 3C and 3D.

FIG. 5 illustrates an example topology table 56 that can be stored in the memory circuit 26 and configured for storing arc topology attributes as the routing arcs are constructed for reaching the destination device (i.e., root network node "R") 14. The processor circuit 22 can update the topology table 56 of FIG. 5 as the state table 54 is updated (e.g., upon identification of SPF links, identification of reversible links, identification of junction nodes 68, upon creating a routing arc, etc.), where the ownership of an arc cursor 18 is identified by the junction node 68 having the two outwardly oriented reversible links. Hence, the processor circuit 20 stores in step 50 the SPF links 58 in the topology table 56, and the non-SPF links (not shown in FIG. 5).

As illustrated in FIG. 6A, none of the network nodes in the DAG topology 52 (except the network node "J") has at least two non-congruent paths for reaching the root node "R". Hence, the method of FIGS. 3B, 3C and 3D provides the creation of the routing arcs 12 in a loop-free routing topology 10, the routing arcs enabling network traffic to be routed along the routing arcs toward the destination root network node via any one of the ends of the routing arcs.

After formation of the directed acyclic graph in step 50, the generation of the routing arcs begins in step 60 of FIG. 3B, where the SPF links are retained, while selectively modifying non-SPF links in the directed acyclic graph as either unidirectional links or reversible links. The status of each network node and each data link can be stored in a memory circuit.

The generation of the routing arcs in step 60 begins with identification of the root network node R and orienting unoriented links toward the root (A→R, B→R) as illustrated by the state change in the state table of FIG. 4A at event 200, and initiating identification of the heir network nodes (e.g., node A) in step 62. As described in further detail below, the SPF nodes are successively analyzed by the processor circuit 22 in step 62 for identification of subordinate directed acyclic graphs (subDAGs) 64 (e.g., 64a and 64b of FIG. 6B) within the DAG 52 toward the destination device 14. Each heir network node link (e.g., A-R) that is coupled to the root network node 14 is oriented outward toward the root network node and marked in the state table 54 as resolved (A→R=Resolved) (event 202 of FIG. 4A). Each neighbor network node is successively resolved in step 66 to identify any junction node within a subDAG 64 that has an alternate non-congruent path for reaching the destination device 14 via a path that is distinct from the subDAG 64; in other words, each neighbor network node 16 is successively resolved to identify, within a subDAG 64, any junction nodes having at least two non-congruent paths for reaching the destination device.

FIGS. 3C and 3D illustrate in further detail the steps executed by the processor circuit 22 in step 66. The steps of FIGS. 3C and 3D are illustrated in the example form of "C code" for a function call entitled "resolve_neighbor(N)", annotated with outline annotations to identify nested operations. The apparatus 20 is omitted in FIGS. 6B through 6I and FIG. 7 to simplify the illustrations, although it will be apparent that the apparatus 20 will be consistently present during calculation of the routing arcs 12 and creation of the loop-free routing topology 10 (and load balancing of the loop-free routing topology 10 as described below with respect to FIGS. 7-9).

The first operation in step 70 is executed by the processor circuit 22 if the neighbor node "N" under analysis is a leaf network node consisting of one and only one data link. In this example, the current state of execution is state 202 of FIG. 4A, where the heir network node "A" is under analysis; hence, step 70 is skipped because the heir network node A is not a leaf node. Step 72 is executed by the processor circuit 22 if the neighbor node "N" under analysis is not a safe node. In this current state of analyzing the heir network node "A", step 72 is skipped because the heir network node A is a safe network node (because it is an heir network node).

As described previously, the method executed by the processor circuit 22 attempts to identify adjacent network nodes that are safe network nodes. Hence, any of the links (N-i) in the safe network node under analysis (e.g., Node N=Node A) that have not yet been labeled (i.e., are unlabeled) (e.g., D→A, C→A), are set initially to an unresolved status toward the nearest safe node (D→A="?-S"; C→A="?-S") to indicate that it has not yet been determined whether the links (e.g., D→A, C→A) couple the network node (e.g., node A) to another safe network node that enables the link to be reversible, or whether the links couple the network node to an unsafe network node (i.e., a network node that is not a safe network node as previously defined).

Each of the links (N-i) of the safe network node under analysis (e.g., node N=node A) are resolved in step 74 in order according to SPF identification, namely links providing shortest path first, followed by outgoing links, followed by incoming links. If in step 76 a data link is already resolved, the execution by the processor circuit 22 proceeds to the next link in step 74: note that the link A→R is resolved and ends in the root network node 14, identifying the link A→R as terminating a routing arc 12. Steps 78 through 86 are currently skipped by the processor circuit 22 because the safe network node under analysis (e.g., node N=node A) has no other unresolved outgoing links. The processor circuit 22 returns to the next link in step 74, namely the incoming links.

If in step 88 the processor circuit 22 determines the unresolved link under analysis (which is not an SPF link or an outgoing link) has no assigned direction, the link is assigned an incoming direction to direct traffic toward the safe network node under analysis (e.g., Node N=Node A). If the incoming link (e.g., D→A based on the initial directed acyclic graph) is marked to an unresolved status (e.g., D→A="?-S"), the incoming link is marked to an unresolved status with respect to the safe network node under analysis (i.e., the link D→A is reset from "?-S" to "?-N"). Hence, the link "D→A" is reset to the status "?-A" (Node N=Node A: D→A="?-A"); the process is repeated in steps 74 and 88 by the processor circuit 22 for the next link of node A, hence the link "C→A" is reset in step 88 to the status "?-A" (C→A="?-A"), indicating that it has not yet been determined whether the links "D→A" and "C→A" are reversible to reach another safe network node (the links are oriented toward the nearest safe network node). Hence, the unresolved status indicates that a routing arc cannot be formed yet because the unresolved link has not been found to be reversible toward an alternate non-congruent path to the root network node. All the unresolved incoming links in the subDAG toward the safe network node "N" (Node N=Node A) are recursively relabeled in step 88, resulting in the identification of subDAG(A) 64*a* of FIG. 6B via the links labeled "?-A".

After all the links for the safe network node under analysis (e.g., Node N=Node A) have been analyzed, the process of steps 62 and 66 of FIG. 3B are repeated by the processor circuit 22 for the next node having the shortest path (in the SPF computation of step 50) to the root network node "R" that has not yet been analyzed (e.g., heir network node "B") (event 204 of FIG. 4A). The network node "B" is identified by the processor circuit 22 as an heir network node in step 62, and the root link "B→R" is identified by the processor circuit 22 as an SPF link and oriented toward the root network node, and marked in the state table 54 and the topology table 56 as a resolved SPF link in step 62. As illustrated by the execution by the processor circuit 22 of step 66 in FIGS. 3C and 3D, since network node "B" is identified as an heir network node (and therefore a safe network node) having an additional incoming link "K-B", steps 70 and 72 are skipped by the processor circuit 22, and the processor circuit 22 changes the status of the link "K→B" in step 88 in the state table 54 from "?-S" to "?-B" (K→B="?-B"). The remaining incoming links are recursively resolved toward the nearest safe node "B", resulting in the subDAG(B) 64*b* of FIG. 6B.

Processing continues by the processor circuit 22 in step 62 of FIG. 3B to the next node identified by the SPF computation as closest to the root network node "R" that has not yet been analyzed, namely the network node "K" (event 206 of FIG. 4A). Step 70 of FIG. 3C is skipped because the network node "K" is not a leaf node. Hence, the network node "K" is not a safe network node because it does not yet have two non-congruent paths to the root network node "R", rather the network node "K" currently has only the SPF link "K→B" to the safe network node "B". Hence, all the non-SPF links (e.g., M-K and J-K) are assigned by the processor circuit 22 to be oriented incoming to the current network node "K" under analysis, and the links are labeled by the processor circuit 22 in step 72 as unresolved to the nearest safe network node (e.g., M→K="?-B"; J→K="?-B").

Hence, the current set of analyzed network nodes include the network nodes "A", "R", "B", and "K".

The method continues by the processor circuit 22 in step 62 of FIGS. 3B and 104 with the next SPF network node, identified as a network node "M" which is not a safe network node (event 208 of FIG. 4A). Step 70 skipped by the processor circuit 22, the node "M→K" is identified as the SPF link, and in step 72 the link "J-M" is assigned in the state table 54 in step 72 as an incoming link having an unresolved status to the nearest safe network node "B" (J→M="?-B").

The next network node chosen by the processor circuit 22 in step 62 of FIG. 3B from the SPF nodes is the network node "D" (event 210), the link "D→A" is identified as the SPF link, step 70 is skipped by the processor circuit 22, and since the network node "D" is not a safe network node, the remaining non-SPF links are assigned by the processor circuit 22 as incoming to the network node "D" in step 72, and labeled in the state table 54 as unresolved to the nearest safe network node "A" (C→D="?-A"; E→D="?-A"; L→D="?-A"). As described in further detail below, the cost of each of the non-SPF links for each of the network nodes can be tracked for later analysis. The method is repeated by the processor circuit 22 for the network node "C" (event 212), resulting in the link "C→A" identified as the SPF link and the labeling of the links E→C="?-A" and F→C="?-A" in the state table 54 in step 72.

The next network node chosen in step 62 of FIG. 3B from the SPF nodes is the network node "L" (event 214). Step 70 is skipped by the processor circuit 22, and since the network node "L" is not a safe network node, link L→D is identified by the processor circuit 22 as the SPF link, the link "E-L" is assigned as incoming to the network node "L", and labeled in the state table 54 as unresolved to the nearest safe network node "A" ("E→L"="?-A") in step 72.

The next network node chosen by the processor circuit 22 in step 62 of FIG. 3B from the SPF nodes is the network node "E" (event 216). Step 70 is skipped, and since the network node "E" is not a safe network node, in step 72 the link E→C is identified by the processor circuit 22 as an SPF link, and all the non-SPF links are oriented as incoming to the network node "E" and labeled as unresolved to the nearest safe network node "A", resulting in the labeling of the links F→E="?-A", G→E="?-A", and H→E="?-A" in the state table 54.

The next network node by the processor circuit 22 in step 62 of FIGS. 3B and 104 from the SPF nodes is the network node "F" (event 218). Step 70 is skipped by the processor circuit 22, and since the network node "F" is not a safe network node, in step 72 the link F→C is identified as an SPF link, and all the non-SPF links are oriented as incoming to the network node "F" and labeled by the processor circuit 22 as unresolved to the nearest safe network node "A", resulting in the labeling of the links H→F="?-A", I→F="?-A", and J→F="?-A" in the state table 54.

The next network node chosen by the processor circuit 22 in step 62 of FIG. 3B from the SPF nodes is the network node "N" (event 220). The network node "N" is identified by the processor circuit 22 as leaf network node based on its one and only one link N→L; hence, the link "N-L" is marked in the state table 54 as resolved (N→L=Resolved) in step 70.

The next network node chosen by the processor circuit 22 in step 62 of FIG. 3B from the SPF nodes is the network node "G" (event 222). Step 70 is skipped, and since the network node "G" is not a safe network node, in step 72 the link G→E is identified by the processor circuit 22 as an SPF link, and the non-SPF link H-G is oriented as incoming to the network node "G" and labeled as unresolved to the nearest safe network node "A", resulting in the labeling of the link H→G="?-A" in the state table 54.

The next network node chosen in step 62 by the processor circuit 22 from the SPF nodes is the network node "H" (event 224). Since the network node "H" is not a safe network node, in step 72 the link H→F is identified by the processor circuit 22 as an SPF link, and the non-SPF link I-H is oriented as incoming to the network node "H" and labeled as unresolved to the nearest safe network node "A", resulting in the labeling of the link I→H="?-A" by the processor circuit 22 in the state table 54.

The next network node chosen by the processor circuit 22 is the network node "I" (event 226. Since the network node "I" is not a safe network node, in step 72 the link I→F is identified by the processor circuit 22 as an SPF link in the state table 54. As described previously, each of the SPF links 58 also can be labeled by the processor circuit 22 in the topology table 56 of FIG. 5.

As apparent from the foregoing description with respect to FIG. 6B, the identification of SPF links and unresolved links enables identification of the shortest path tree plus alternative unresolved links that can be used for identification of an alternate non-congruent path that is distinct from the shortest path to the root network node. The following description with respect to node "J" demonstrates how the identification of the alternative unresolved links enables identification of one or more junction nodes within the subDAGs 64a and 64b for formation of the arc routing topology.

In particular, the following description illustrates the identification within the DAG 52 (two or more) junction nodes, and reversible links (labeled "Rev") between the unction nodes and that can be reversed along one of the non-congruent paths of the junction nodes, without introducing a loop into the loop-free topology. In addition, the identification of a junction node in one subDAG (64a or 64b) that has a non-congruent path for reaching the destination device 14 (distinct from the junction node serving as the root of the subDAG) enables formation of another infrastructure arc overlying a first infrastructure arc.

As illustrated with respect to FIGS. 6B and 6C, the next network node chosen by the processor circuit 22 in step 62 of FIG. 3B from the SPF nodes is the network node "J" (event 228). The node "J" is identified by the processor circuit 22 as a safe network node because it can be classified as a junction node 68, illustrated in FIGS. 3C and 3D. The node "J" can be identified by the processor circuit 22 as a junction node because it has two non-congruent paths for reaching a safe node (e.g., the root network node "R") via the link J→F (labeled as unresolved to the nearest safe network node "A", i.e., "?-A"), and/or the link J→K (labeled as the SPF link unresolved to the nearest safe network node "B", i.e., "?-B"). Hence, the non-congruent paths provided by the links J→F and J→K are identified by the respective and distinct labels "?-A" and "?-B" identifying reachability to the root network node "R" via the respective safe network nodes "A" and "B".

Step 72 is skipped by the processor circuit 22 because the network node "J" is identified as a junction node. Each of the data links of the network node "J" are resolved in step 74 in a prescribed order, namely SPF link first, then any outgoing link(s), then any incoming link(s). Hence, the link J→K is the SPF link and therefore the first link to be analyzed in step 74. Since the link J→K is unresolved in step 76, the outgoing link J→K in step 78 does not end in another junction, hence step 80 is skipped.

Referring to FIG. 3D, the processor circuit 22 determines whether to execute step 82 if the network node is not yet an intermediate junction. Step 82 is executed by the processor circuit 22 for the link J→K of the network node "J" because if the link J→K, if reversed, the link reversal would enable the endpoint network node "K" to become a junction node, i.e., the endpoint network node "K" could now have an alternate path to the root network node "R" via the safe network node "A" (e.g., if the label of link J→K was changed upon link reversal from "?-B" to "?-A"); hence, the link J→K enables the node "J" to become a junction and does not cause any pruning of the SPF link J→K. Consequently, the link J→K is resolved by marking the link in the state table 54 as reversible ("Rev") by the processor circuit 22 in step 82. The labeling of the link J→K as reversible ("Rev") is illustrated in FIG. 6D.

Since the node "J" is an edge junction toward the safe network node "B", step 84 is executed by the processor circuit 22 to prevent the formation of a loop via the outward link "J→M" in the event that the link J→K is ever reversed to K→J in order to reach the safe network node "A"; hence, since "J→M"="?-B" is an outward link satisfying the condition "?-S" (where S=B), the outward link "J→M"="?-B" is pruned in step 84 by blocking the path toward node "M" (note the square □ in FIG. 6C at the end of the link intersecting with network node "M", indicating traffic from network node "J" to network node "M" is blocked); the direction of the pruned (i.e., blocked) link J-M is reversed and relabeled by the processor circuit 22 as unresolved inward toward the new safe network node (junction node), i.e., M□→J="?-J" in the state table 54.

Also note that if in step 84 another link existed (e.g., J→B) (not shown in FIG. 6B) as an unresolved link toward the safe node "B" (J→B="?-B"), that link (J→B) could be pruned at both ends (i.e., removed: J□-□B) in order to avoid the possibility of any loops in the event of any link reversal.

Hence, in order to avoid loops a junction node in a routing arc can have one and only one link toward a first end of the arc, and one and only one other link toward a second end of the arc. The link J→F is unaffected in step 84 because J is an edge junction toward safe node "B" (via J→K), whereas the node J→F is toward the other safe network node "A".

Step 86 is skipped by the processor circuit 22 for junction node "J" because it is not yet an intermediate junction because it does not yet have two reversible links. Step 88 is skipped because the SPF link J→K is assigned as an outgoing link.

Execution of step 78 by the processor circuit 22 with respect to the SPF link J→K ("Rev") continues in step 90, which recursively calls execution of step 66 (as illustrated in FIGS. 3C and 3D) for the endpoint of the link J→K, namely the network node "K", in order to extend the arc along the shortest path link; in other words, the steps of FIGS. 3C and 3D are executed based on the change in status of the link J→K to a reversible link (event 230 of FIG. 4B). Hence, step 70 is skipped for the J→K link endpoint node "K" (which is not a leaf node). The J→K link enables the endpoint node "K" to now become a junction node since the link J→K link is now reversible, hence the network node "K" as a junction node (specifically, an edge junction), and now a safe network node, hence step 72 is skipped by the processor circuit 22. Each of the safe network node "K" links are resolved in step 74, starting with the SPF link K→B: step 76 is skipped by the processor circuit 22 because the SPF link K→B="?-B" is not yet resolved. The SPF link K→B is an outgoing link, hence step 78 is executed by the processor circuit 22: step 80 is not executed by the processor circuit 22 because the node K→B does not end in another junction node (i.e., the heir network node "B" is not a junction node). Step 82 is executed by the processor circuit 22 because network node "K" is not an intermediate junction node yet, and the link K→B enables the end point network node B to become a junction node, hence the node K→B is labeled as reversible, K→B="Rev" in step 82, to enable the heir network node "B" to become labeled by the processor circuit 22 as a junction node in the state table 54.

In step 84 the node N=K is now an edge junction toward node "B", and there is no outward unresolved link to be pruned; however, the link M→K is relabeled by the processor circuit 22 from "?-B" to "?-K" in the state table 54. In step 86 the network node "K" is now identified by the processor circuit 22 as an intermediate junction having two reversible links J→K="Rev" and K→B="Rev"; however, there are no other outward links other than the two reversible links, hence no pruning of other outward links is needed.

Hence, the resolution of the link J→K at node J as a reversible link causes resolution of the link endpoint K to be recursively resolved by the processor circuit 22 at step 90, resulting in the resolution of reversible link K→B at node K. The resolution of the reversible link K→B at node K causes in step 90 the recursive resolution by the processor circuit 22 of the link endpoint B (event 232).

The heir network node B is identified as an edge junction based on the reversible link K→B, and since the SPF link B→R is to the root, the heir network node "B" is identified as the end of a routing arc. The resolution of node B causes the recursive execution by the processor circuit 22 in step 90 to return to network node "K" (event 234) to continue resolving the remaining links of the network node K.

Hence, the SPF link has been resolved in network node K, no outgoing links need to be resolved, causing the analysis of the link M→K="?-K" at step 74. Each of the steps 76, 78, are skipped by the processor circuit 22 because the link M→K is not outgoing, and the incoming link is already marked unresolved to K "?-K". Hence, the processor circuit recursively resolves the endpoint M of the link K→M in step 90 (event 236).

The network node M is determined by the processor circuit 22 in step 72 to be a safe node because it has two non-congruent paths to the root, namely the path "?-K" via the link M→K, and the path "?-J" via the link M→J. Starting with the shortest path link M→K, in step 78 the link is identified in step 80 as ending in another junction "K", enabling the link M→K to be marked by the processor circuit 22 as resolved in the state table 54 (and a first end of the collapsed arc "ARC1" of FIG. 6D and FIG. 6I). A recursive call by the processor circuit 22 from network node M to network node K in step 90 (event 238) results in no changes, hence the processor circuit 22 returns to network node M (event 240), and the processor circuit 22 resolves the next outgoing and unresolved link M→J="?-J" into a resolved link in step 80 (and the second end of the collapsed arc "ARC1" of FIG. 6I).

Referring to FIG. 4B, the recursive resolution of network node "M" (as the endpoint of the link M-K) is complete, causing the processor circuit 22 return to the network node "K" at event 242 of FIG. 4C; the recursive resolution of the network node "K" also is complete, causing the return to network node "J" at event 244.

Note that the network nodes "K" and "M" are junction nodes without changing the link reversibility. Hence, the link M→J terminates a routing arc because it ends in a junction node "J", and the link M→K terminates in a routing arc because it ends in another junction node "K". Hence, the network nodes "J", "K", and "M" form a collapsed arc "ARC1" 12, illustrated in FIG. 6D.

The processor circuit 22 in step 74 repeats the link analysis for the next link of the junction node "J", namely the outgoing link J→F="?-A". After skipping step 76, step 80 is skipped by the processor circuit 22 because the network node "F" is not a junction in FIG. 6D, hence link J→F does not end in another junction. The network node "J" is not an intermediate junction yet because it does not have two reversible paths, hence step 82 is executed to make the link J→F reversible (J→F="Rev") because the reversal of link J→F enables the endpoint network node "F" to become a junction having an alternate path to the root network node "R" via "?-A" and the path via the network node "J". The network node "J" was already an edge junction, hence step 84 is skipped.

Marking the link J→F reversible in step 78, however, now makes the safe node "J" an intermediate junction, hence step 86 is executed by the processor circuit 22: the description in step 86 of "prune outwards all links of safe node N but the 2 reversible links . . . " ensures that there are no outward links except along the arc (formed via network nodes F, J, K, and B) 12, such that any other links are pruned and directed inwards (as executed previously with respect to the link M☐→J). Step 88 is skipped by the processor circuit 22 because the link J→F is not incoming, and step 90 is executed to recursively resolve the neighbor for the endpoint node of the link J→F, namely the network node "F" (event 246).

The processor circuit 22 skips step 70 during resolution of the network node "F" it has multiple links. The network node "F" is identified as an edge junction (and therefore a safe node) because it has two non-congruent paths to the root node "R", and the network node "F" includes one reversible link J→F, hence, execution of step 72 is skipped. As will be described in further detail below, the junction node "F" belongs to the subDAG(A) 64a of FIG. 6B, and the junction nodes "J", "K", and "B" belong to the subDAG(B) 64b; hence, a first infrastructure arc ("ARC2" illustrated in FIG. 6E) 12 can be created that comprises (at least two or more) junction nodes and (one or more) reversible links, where one end of the first infrastructure arc terminates at the destination device "R".

Each of the links of the safe node "F" are analyzed in step 74, starting with the SPF link F→C: steps 76 and 80 are skipped, and step 82 is executed by the processor circuit 22 to mark the link F→C as reversible (F→C="Rev"). Step 84 is executed by the processor circuit 22 because the network node "F" is now an edge junction towards "S" (S=A). Hence, in step 84 any outgoing unresolved links labeled "?-A" (e.g., F→E="?-A") are pruned and reversed inwards toward the edge junction and marked by the processor circuit 22 as unresolved toward the edge junction (e.g., change from F→E="?-A" to E☐→F="?-F") in the state table 54; further, in step 84 all incoming links (i.e., inward links) of the safe node "F" are changed by the processor circuit 22 from "?-A" to "?-F" (e.g., change H→F="?-A" and I→F="?-A" to H→F="?-F" and I→F="?-F"). The relabeling of the links E☐→F, H→F, and I→F in step 84 in the state table 54 exposes the network nodes "E", "H", and "I" to the alternate path to the root node "R" via the edge junction "F", enabling the network nodes "E", "H", and "I" to be later identified as new junction nodes (and therefore safe network nodes) having new non-congruent paths for reaching the root node "R", distinct from the path provided by the subDAG (A) 64a. hence, the network nodes "E", "H", and "I" can later be used to create secondary infrastructure arcs based on the non-congruent paths distinct from the subDAG (A) 64a.

The edge junction "F" is not an intermediate junction yet, hence step 86 is skipped, and step 88 is skipped because the incoming link E☐→F is already marked "?-F" as unresolved toward the edge junction "F".

A recursive call is executed by the processor circuit 22 in step 90 for the endpoint network node "C" of the SPF link F→C="Rev" (event 248).

The recursive resolution by the processor circuit 22 of the network node "C" skips step 70 because it has multiple links. The network node "C" is identified as an edge junction (and therefore a safe node) because it has two paths to the root node "R", and the network node "C" includes one reversible link F→C, hence, execution of step 72 is skipped by the processor circuit 22. Steps 76 and 80 are skipped, and step 82 is executed by the processor circuit 22 to mark the link C→A as reversible (C→A="Rev") in the state table 54. Step 84 is executed by the processor circuit 22 because the network node "C" is now an edge junction towards "S" (S=A). Hence, in step 84 any outgoing unresolved links labeled "?-A" (e.g., C→D="?-A") are pruned and reversed inwards by the processor circuit 22 toward the edge junction "C" and marked in the state table 54 as unresolved toward the edge junction (e.g., change from C→D="?-A" to D☐→C="?-C"); further, in step 84 any incoming links of the safe node "C" are changed by the processor circuit 22 from "?-A" to "?-C" (e.g., change E→C="?-A" to E→C="?-C") in the state table 54. The relabeling of the links D☐→C and E→C in step 84 exposes the network node "D" to an alternate path to the root node "R" via the edge junction "C", enabling the network node "D" to be later identified as a junction node having two non-congruent paths for reaching the root node "R".

The edge junction "C" is not an intermediate junction yet, hence step 86 is skipped by the processor circuit 22, and the link C→A is not incoming, hence step 88 is skipped. A recursive call is executed in step 90 for the endpoint network node "A" of the SPF link C→A="Rev" (event 250).

The recursive resolution by the processor circuit 22 of the network node "A" skips step 70 because it has multiple links. The heir network node "A" is a safe node, and is identified as an edge junction because it has two non-congruent paths to the root node "R", and the network node "A" includes one reversible link C→A, hence, execution of step 72 is skipped. The SPF link A→R is first selected in step 74 and identified in step 76 as resolved. The resolved SPF link A→R also ends in the root "R", and therefore terminates the arc identified by the sequence of recursively called neighbors A(C,F, J) extending back to the intermediate junction "J", and extending to the edge junction "B".

Hence, the identification of the SPF link A→R as resolved during the successive recursion by the processor circuit 22 from the intermediate junction "J" (i.e., a junction node having two reversible links), establishes the junction node "A" as the second edge junction, resulting in the first infrastructure arc "ARC2" for reaching the root node "R", illustrated in FIG. 6E and FIG. 6I. As illustrated in FIGS. 6E, 6H, and 6I, the infrastructure arc "ARC2" for reaching the root node "R" includes the junction nodes "A", "C", "F", "J", "K", and "B" connected by the reversible links A-C, C-F, F-J, J-K, and K-B. Hence, the infrastructure arc "ARC2" for reaching the root node "R" can be identified based on traversing the sequence of an heir network node (e.g., "A") and the sequence of reversible links until reaching another heir network node (e.g., "B").

The next link of junction node "A" is analyzed in step 74, namely the link D→A=?-A, resulting in the recursive resolution of the network node "D" in step 90 (event 252). The network node "D" is now a junction node (and therefore a safe node), because it has two non-congruent paths (via nodes A and C) for reaching the root node "R". Hence, steps 70 and 72 are skipped, and step 74 is executed first for the SPF link D→A. The link D→A is marked as resolved in step 80 based on terminating in the junction node A. The recursive calling from node "D" to node "A" causes the recursive analysis for node "A" to return back to node "D", as all other links have already been analyzed with respect to node "A": such a return is referred to as a "no-op recursion", and will be omitted in future discussion for brevity.

The analysis for node "D" continues for link D☐→C in step 74. The link D☐→C ends in the junction node "C" and therefore is marked as resolved in step 80, resulting in the formation of the collapsed arc "ARC3" 12 illustrated in FIG. 6I. The incoming link L→D is next analyzed with respect to the junction node D in step 74, and relabeled in step 88 from the unresolved status of ?-A to the unresolved status ?-D (L→D="?-D"), indicating that the nearest safe node is the node "D".

As illustrated in FIG. 6F, the safe node "D" can form its own subordinate directed acyclic graph SubDAG(D) 64d within the SubDAG(A) 64 toward the root node "R", such that the safe node "D" becomes the closest safe node for the network nodes "L", "N", "E", "G", "H", and "I". Hence, similar to step 72, all the unresolved incoming links in the SubDAG of safe node "D" (e.g., links L→D, E→D, E→L, G→E, H→G, I→H, and H→E) are recursively relabeled (i.e., marked) in step 88 to "?-D" to propagate the identification of the newest safe node "D" (state 252).

The recursive analysis in step 90 of the node "L" by the processor circuit 22 results in a no-op recursion because the node "L" is not yet a safe node, hence the analysis returns to the node "D".

The link E→D is next analyzed with respect to the junction node D in step 74, and relabeled in step 88 by the processor circuit 22 from the unresolved status of ?-A to the unresolved status ?-D (E→D="?-D") in the state table 54. The analysis for node E is recursively called by the processor circuit 22 in step 90 (event 254).

The network node E is a junction node (and therefore a safe node) because it has two non-congruent paths to the root via junction nodes "D" and "E", without changing any link reversibility. The following links of junction node "E" need to be analyzed in step 74, in the following example order: E→C, E→D, E→L, E☐→F, G→E, and H→E.

Hence, the SPF link EC is marked as resolved in step 80 because it ends in the junction node "C". The outgoing link E→D is analyzed with respect to the network node "E" in step 74, and is marked as resolved in step 80 (becoming the first end of the collapsed arc "ARC8" of FIG. 6I) because it ends in the junction node "D". The outgoing link E→L is next analyzed in step 74, and since the link E→L enables in step 82 the endpoint node "L" to become a junction, the link E→L is marked as reversible in step 82. The endpoint "L" is recursively analyzed in step 90 (event 256).

Referring to FIG. 4D and event 256, the network node "L" is identified as an edge junction (and therefore a safe node) because it has the reversible link E→L. The link L→D is marked as resolved in step 80 because it ends in the junction node "D", resulting in the formation of the second infrastructure arc "ARC4" of FIG. 6G and FIG. 6I. Since the arc "ARC4" ends in a safe node "D", then even though all traffic from the arc "ARC4" could exit via network node C (i.e., network node "D" sends its traffic to network node C via the link D☐→C), the network node "D" still has an alternate path via network node A. The link N→L has already been resolved for the leaf node N, hence the analysis returns to network node "E".

The next link under analysis by the processor circuit 22 with respect to the network node "E" (event 258) is the link E☐→F="?-F in step 74. The link E☐→F is resolved in step 80 as ending in the junction node "F" (resulting in the formation of the collapsed arc "ARC8"). Although the link E☐→F was pruned as unidirectional, it could be safely reversed for LFA analysis, if desired (step 90 is a no-op for the endpoint node F of link E☐→F, hence, analysis returns to the network node "E").

The incoming link G→E of network node "E" is next analyzed in step 74. Since the network node "G" is not a junction, it is not a safe node and therefore the link GE cannot be resolved, but is relabeled ?-E in step 88: all incoming links to the safe node "E" also are recursively marked by the processor circuit 22 as unresolved toward "E" (namely, links G→E, H→E, H→G, and I→H all are reset to "?-E") resulting in the formation of a subDAG(E) toward E. Analysis of the network node "G" is recursively called as the endpoint of the link G→E in step 88.

The network node "G" (event 260) is determined to not be a junction node, and all links are already labeled to the nearest safe node "E", hence step 72 can be skipped and the processor circuit 22 can return back to node "E" in event 262.

The next incoming link H→E of the safe node "E" is analyzed in step 74, causing the processor circuit to recursively analyze in step 90 the endpoint node "H" at event 264.

The network node "H" in steps 72 and 74 is identified as a junction node having non-congruent paths via unresolved paths "?-F" (via the SPF link H→F) and "?-E" (via the links H→E and H→G). Hence, each of the links of the safe node "H" are successively resolved in step 74, namely the links H→F, H→E, H→G, and I→H.

The SPF link H→F of the safe network node "H" is resolved by the processor circuit in step 80 as ending in the junction node "F": as will be shown later, the link H→F will terminate the infrastructure arc "ARC5" and the collapsed arc "ARC6" of FIG. 6I. Step 90 results in a no-op recursive analysis of node "F" (as the endpoint of the link H→F), hence, the analysis of the next (outgoing) link H→E for the safe node "H" in step 74 causes the link H→E (ending in the junction node "E") to be resolved in step 80 as the second end of the collapsed arc "ARC6".

Step 90 results in the no-op recursive analysis of node "E" (as the endpoint of the link H→E), hence the analysis of the next (outgoing link) H→G for the safe node "H" is executed in step 74. In step 82 the link H→G enables the endpoint node "G" to become a junction; further, the link H→G if reversed does not cause pruning of the SPF link H→F; hence, the link H→G is relabeled in step 82 by the processor circuit 22 to a reversible link (H→G="Rev") in the state table 54. Step 90 is executed for recursive analysis of the endpoint node "G" of the link H→G (event 266).

The network node "G" is determined in step 72 to be an edge junction (and therefore a safe node) based on the reversible link H→G. Hence, analysis of the SPF link G→E in step 74 results in step 80 with the link G→E being labeled as resolved as the second end of the infrastructure arc "ARC5". Step 90 results in the no-op recursive analysis of node "E" (as the endpoint of the link G→E), and since the safe network node "G" has no other links to resolve, execution returns to node "H" for evaluation of the next incoming link I→H (event 268).

The next link in step 74, namely the incoming link I→H of the safe network node "H": The link I→H is relabeled in step 88 from I→H="?-A" to I→H="?-H", and the step 90 is executed by the processor circuit 22 for recursive analysis of the endpoint node "I" of the link I→H (event 270).

The network node "I" is determined by the processor circuit 22 in step 72 to be a junction node having non-congruent paths via unresolved paths "?-F" (via the SPF link I→F) and "?-H" (via the outgoing link I→H). Hence, in step 74 the SPF link I→F is analyzed by the processor circuit 22, and marked in step 80 as resolved (and terminating the collapsed arc "ARC7") based on ending in the junction node "F". Step 90 results in the no-op recursive analysis of node "F" (as the endpoint of the link I→F), resulting in analysis in step 74 of the next (outgoing link) I→H. Since the link I→H ends in the junction node "H", the link I→H is labeled in step 114 as resolved, forming the second end of the collapsed arc "ARC7" of FIG. 6I. Step 90 results in the no-op recursive analysis of node "H" (as the endpoint of the link I→H), returning execution analysis to junction node "I".

Analysis of node "I" is completed by the processor circuit 22, returning execution analysis by the processor circuit 22 to node "H"; analysis of node "H" is complete, returning execution analysis to node "E"; analysis of node "E" is complete, returning execution analysis to node "D"; analysis of node "D" is complete, returning execution analysis to node "A";

analysis of node "A" is complete, returning execution analysis to node "C"; analysis of node "C" is complete, returning execution analysis to node "F"; and analysis of node "F" is complete, returning execution analysis to node "J". As described previously, the processor circuit 22 can update the topology table 56 of FIG. 5 as each routing arc is constructed, where the ownership of an arc cursor is identified by the junction node having the two outwardly oriented reversible links.

The resulting link topology is illustrated in FIG. 6H, with the resulting arcs "ARC1" through "ARC8" illustrated in FIG. 6I. The routing topology of FIG. 6I illustrates the routing arcs "ARC1" through "ARC8", with all the network nodes being junction nodes except for the root network node "R" and the leaf node "N". As illustrated in FIGS. 6H and 6I, the collapsed arc "ARC1" includes the junction nodes "J", "M", and "K"; the infrastructure arc "ARC2" for reaching the root node "R" includes the junction nodes "A", "C", "F", "J", "K", and "B" connected by the reversible links C→A, F→C, J→F, J→K, and K→B; the collapsed arc "ARC3" includes the junction nodes "A", "D", and "C"; the infrastructure arc "ARC4" includes the junction nodes "D", "L", "E", and "C"; the infrastructure arc "ARC5" includes the junction nodes "E", "G", "H", and "F"; the collapsed arc "ARC6" includes the junction nodes "E", "H", and "F"; the collapsed arc "ARC7" includes the junction nodes "H", "I", and "F"; and the collapsed arc "ARC8" has the junction nodes "D", "E", and "F".

Consequently, assuming the link FC encountered a failure, the network node "F" could redirect traffic to the node "J" via the reversible link J→F (e.g., based on the network nodes "F" and "J" negotiating that the link J→F needs to be reversed to F→J, enabling network traffic to be redirected without recalculation of routes.

As apparent from this disclosure, the loop-free routing topology 10 for the destination device ("R") 14 can be repeated for each network node 16, enabling each network node 16 to have its own loop-free routing topology 10 that guarantees reachability to the corresponding network node 16 via non-congruent paths.

Distributed Establishment of Loop-Free Label Switched Paths in the Loop-Free Routing Topology As described previously, the loop-free routing topology 10 illustrated in FIG. 6I enables network traffic to be redirected instantaneously in response to a detected failure in the routing topology based on reversing a reversible link, without introducing any loops into the topology. The loop-free routing topology 10 also can utilize a new label distribution protocol that enables the network nodes 16 to establish loop-free label switched paths for reaching the destination device 14 via the loop-free routing topology 10. The apparatus 20 can be configured for not only computing the arc topology 10, but also generating a set of serialized representations describing the loop-free routing topology, where each serialized representation describes a corresponding path in the topology: as described herein, the "path" as used herein is not necessarily limited to the disclosed routing arcs. The set of serialized representations can be propagated from the destination device 14 to the network nodes 16 in the computing network, enabling each of the network notes to establish their own loop-free label switched paths for reaching the destination device 14.

The apparatus can be implemented, for example, as a centralized path computing engine associated with a network management system, the destination device 14, or any node computing the topology 10 for a number of destinations within a prescribed autonomous system.

Figure 7:
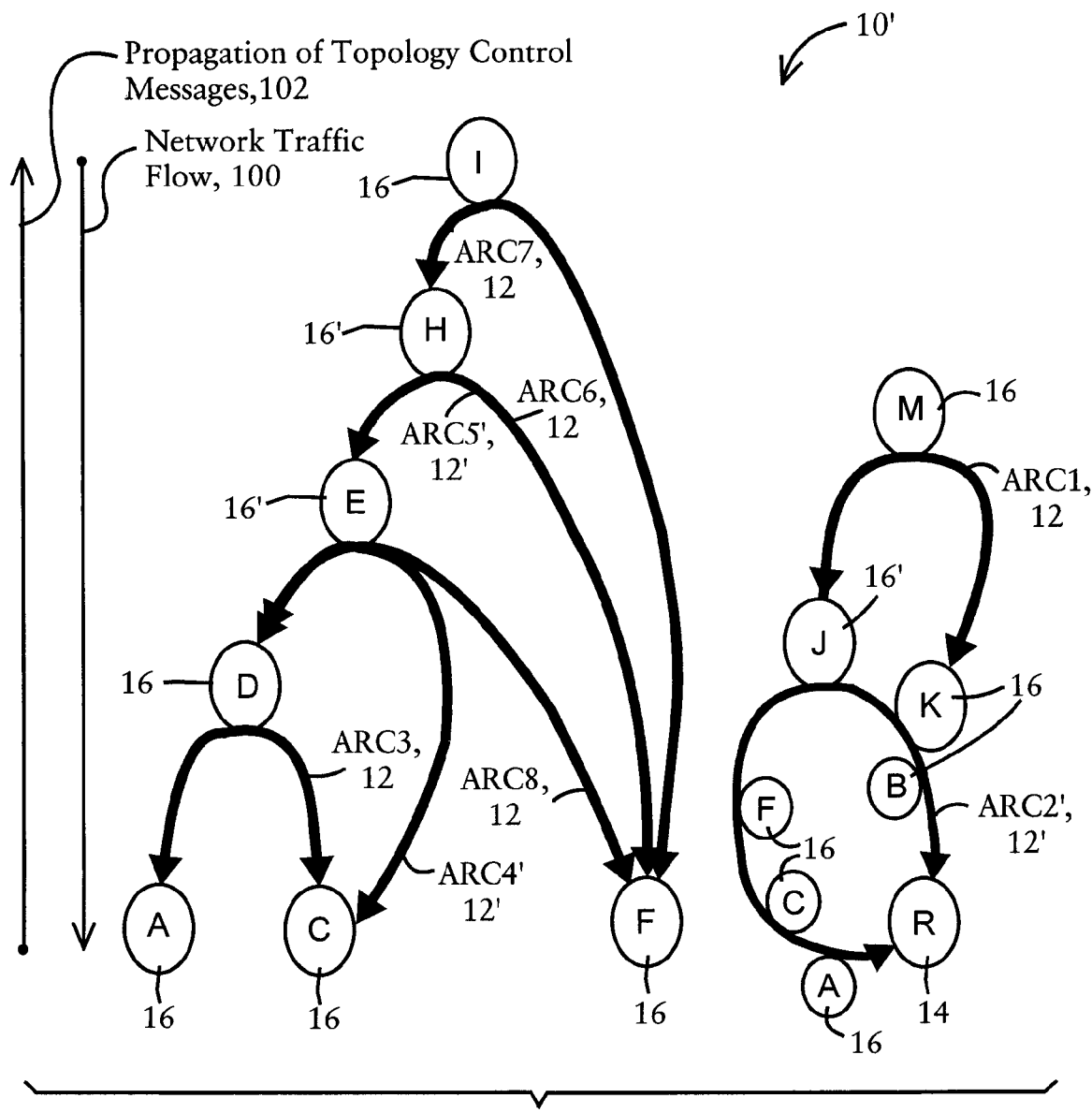
FIG. 7 illustrates the loop-free routing topology of FIG. 6I as an example hierarchy of successively cascaded routing arcs, for propagation of a set of serialized representations of paths in the routing topology, according to an example embodiment.

FIG. 7 illustrates an example hierarchy 10' of successively cascaded routing arcs, constructed by the apparatus 20 of FIG. 2 according to an example embodiment. In particular, the loop-free routing topology 10 can be represented by the apparatus 20 as a hierarchy 10' that contains the same routing arcs 12 for reaching the destination 14, except that the routing arcs 12 are redrawn as a hierarchy of successively cascaded (collapsed) routing arcs 12 or 12' that supply network traffic in the "downward" direction 100 to a destination 14.

As illustrated in FIG. 7, all network traffic toward the destination 14 follows the direction of the network traffic flow 100, ending at the root 14 or the network nodes "A", "C", or "F" along the root arc "ARC2" 12. Hence, all network traffic flows along the path 100 down the hierarchy 10' of successively cascaded routing arcs 12 or 12' supplying network traffic to the destination 14.

Conversely, topology control messages 102 can be propagated from the destination device 14 to each of the network nodes 16 in the computing network. The topology control messages 102 include a "set of serialized representations" (described below) describing relevant paths (e.g., routing arcs 12) of the loop-free routing topology 10. The topology control message 102 is used to flood the serialized representations of the relevant paths over the loop-free routing topology 102, across each of the network nodes 16 along each of the routing arcs 12: in other words, a network node (e.g., "C") 16 passes the topology control message (containing the set of serialized representations) to any of its neighbors that can send network traffic back to that network node (e.g., "C"), except that the network node (e.g., "C") will not send the topology control message back to the transmitting network node (e.g., "A") that had just sent the topology control message to the network node ("C"). Hence, each network node 16 can learn the relevant paths of the loop-free routing topology 10 in response to parsing the set of serialized representations contained in a topology control message 102.

Each topology control message 102 also includes one or more locally significant labels ("λ") generated by the network node 16 transmitting the topology control message 102. Each locally significant label generated by the transmitting network node 16 can have an arbitrary numeric value. As described below, each locally significant label is associated with prescribed attributes set by the transmitting network node 16 for forwarding a data packet to the destination device 14: as described below with respect to FIG. 15 the transmitting network node 16 stores the locally significant table (and associated attributes) in a label forwarding table; the network node receiving the topology control message 102 also stores the received locally significant label in a new label forwarding table entry in its own label forwarding table, creates a new locally significant label as an index to the new label forwarding table entry, and retransmits the set of serialized representations with the new locally significant label in a retransmitted topology control message.

Hence, the topology control messages 102 enable the network nodes 16 to each independently establish loop-free label switched paths for reaching the destination device 14 via the loop-free routing topology 10. Moreover, multiple locally significant labels can be specified within a single topology control message 102, for example a primary label for a default path to reach the destination, and a "backup" (or "fast reroute") path to reach the destination. Topology control messages 102 also can be propagated along both ends of a bidirectional routing arc 12, resulting in a total of four locally significant labels identifying four respective paths available for reaching the destination node 14 by a network node 16. The loop-free label switched paths can be implemented, for example, using multiprotocol label switched (MPLS) labels according to RFC 3031 or RFC 6178, label distribution protocol (LDP) according to RFC 3036 or 5036; alternately the labels can use other tagging techniques, for example IEEE 802.1q (or Q in Q) as labels in carrier Ethernet, IPv6 flow labels, or direct encapsulation over ATM or frame relay. Other topology information can be transmitted over the routing arcs 12 once established, for example as illustrated in U.S. Pat. No. 7,693,064.

Hence, the label switched paths enable any network node 16 along the bidirectional paths to instantaneously reverse the transmission of a data packet to an alternate (backup) label switched path in response to the network node detecting a failed link; moreover, loops are avoided by using different label switched paths to identify a default path in one direction of the bidirectional path (e.g, routing arc), a default path in a second direction of the bidirectional path, a backup (fast reroute) path that is used in response to detecting a failed link in the default path in the one direction, and a second backup (fast reroute) path than that is used in response to detecting a failed link in the default path in the second direction.

Figure 8:
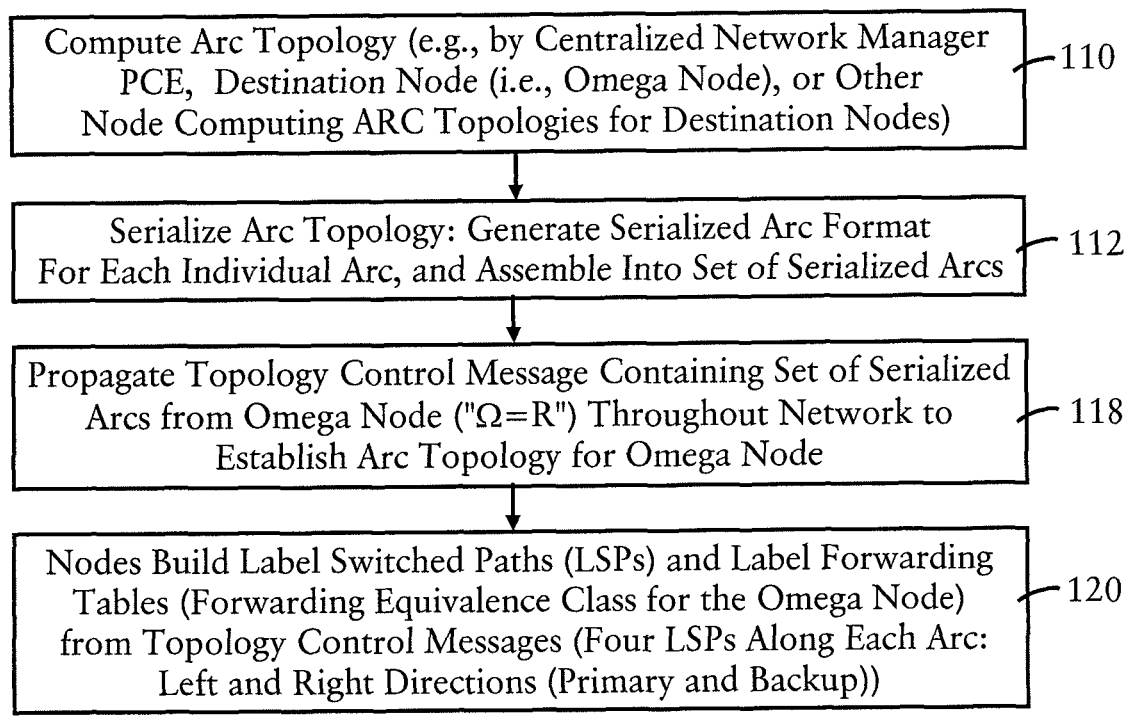
FIG. 8 illustrates an example method summarizing the method of generating and propagating a set of serialized representations describing the loop-free routing topology, that enables network nodes to establish loop-free label switched paths for reaching a destination device, according to an example embodiment.

FIG. 8 illustrates an example method for label distribution and route installation in the loop-free routing topology, according to an example embodiment. Referring to FIGS. 2, 6I, and 8, the processor circuit 22 in the apparatus 20 is configured for creating in a computing network a loop-free routing topology 10 for reaching the destination device "R" in step 110 as illustrated in FIG. 6I and as described previously with respect to FIGS. 1 through 6I. The computing network may be an autonomous system, or any part thereof, for example a local area network, an ad hoc network such as a mobile ad hoc network, a sensor network, etc. As described previously, the loop-free routing topology 10 comprises distinct paths 12 for reaching the destination device 14.

The processor circuit 22 also is configured for generating in step 112 a set of serialized representations describing the loop-free routing topology 10. As described in further detail below with respect FIGS. 10 and 14, each serialized representation 114 describes a corresponding one of the paths 12. The processor circuit 22 also assembles all of the serialized representations 114 of the respective paths (e.g., routing arcs 12) into a set 116 of serialized representations, illustrated in FIG. 12. Hence, the set of serialized representations 116 can provide a representation of the entire loop-free routing topology 10.

The processor circuit 22 can generate in step 118 a topology control message 102 containing the set of serialized representations 116, enabling the network interface circuit 24 of the destination node "R" to output in step 118 the topology control message 102 on each of its incoming links (i.e., toward nodes "A" and "B") causing the topology control message 102 to be propagated throughout the network. Since the destination node "R" 14 is the final destination for the loop-free topology 10, the destination node 14 also is referred to generically as the "omega node" ($\Omega$). Hence, the omega node ($\Omega$="R") 14 defines the forwarding equivalence class (FEC) for the topology control message 102: the topology control message 102 also specifies a locally significant label (e.g., an MPLS label) (e.g., "$\lambda$=R_AR" for the link "R-A" or "R_BR" for the link "R-B") that is associated with the network interface that outputs the message to the next hop network node 16 for the forwarding equivalence class "$\Omega$=R".

As used herein, the nomenclature "$\lambda$=X_YZ" refers to a locally significant label "$\lambda$" identifying the link in the direction from node "Z" to node "Y" for the forwarding equivalence class "$\Omega$=X" to be used as a default (i.e., primary) path in reaching the destination node "$\Omega$=X": in other words, the node "Z" generates the locally significant label "$\lambda$=X_YZ" to notify the node "Y" (i.e., topology control message "to Y from Z") that the label "$\lambda$=X_YZ" is to be used for forwarding a data packet via node "Z" along a default path to the destination node "$\Omega$=X" (i.e., data traffic destined for "$\Omega$=X" via default path is sent "from Y to Z"). An additional extension (e.g., "FRR") can be used to identify an additional label attribute, namely that the link is to be used as a fast reroute ("FRR") path (i.e., backup path) in the even of a link failure on the default path. The locally significant label can be implemented as a numeric value that provides an index into a label switching table within a network node. Hence, a topology control message 102 output by a network node 16 and containing the set of serialized representations can further include a default label "$\lambda$=X_YZ" and a backup (fast reroute) label "$\lambda$=X_ZY_FRR" for the forwarding equivalence class "$\Omega$=X". Since the routing arcs 12 are bidirectional, the node "Y" also can receive another topology control message 12 from the "other end" of its arc, and in response send to the node "Z" a topology control message 102 specifying the default label "$\lambda$=X_ZY", the backup label "$\lambda$=X_YZ_FRR", and the set of serialized representations.

Hence, the omega node ($\Omega$="R") 14 outputs in step 118 (118a of FIG. 12) the topology control message 102 with the set of serialized arcs (116 of FIG. 12): the omega node ($\Omega$="R") 14 also adds a locally significant label "$\lambda$=R_AR" to the topology control message 102 output onto the link "R-A" to the network node "A", and a locally significant label "$\lambda$=R_BR" to the topology control message 102 output onto the link "R-B" to the network node "B".

In response to the network node "A" 16 receiving the topology control message 102 with the locally significant label "$\lambda$=R_AR" on an identified network interface (e.g., "A1"), the network node "A" can create in step 120 an entry in its internal label forwarding table for the forwarding equivalence class $\Omega$="R" that any data packet destined for the destination node "$\Omega$=R" 14 via the link "R-A" should be output onto the network interface "A1" with the locally significant label "$\lambda$=R_AR" (as described previously, a locally significant label can be an arbitrary numeric value chosen by the source of the label).

The processor circuit 22 in the network node "A" 16 also can determine the routing topology 10 from the set of serialized arcs 116 in the topology control message 102. Hence, the processor circuit 22 in the network node "A" 16 can create additional label forwarding table entries for the network nodes "C" and "D" that are configured to send network traffic to the destination node "$\Omega$=R" 14 via the network node "A": the label forwarding table entry for the network node "C" can specify a new locally significant label "$\lambda$=R_CA" (used as an index into the label forwarding table), the destination label "$\lambda$=R_AR", and the outbound network interface A1. Hence, if the network node "A" receives a data packet from the network node "C" that specifies the locally significant label "$\lambda$=R_CA", the network node "A" can use the specified locally significant label as an index into the label forwarding table to recover from the forwarding table entry the destination label "$\lambda$=R_AR" (to be swapped with the existing label in the received data packet) and output the data packet onto the network interface "A1" for transfer to the destination node 14 via the link "A-R".

Hence, in step 118 the network node "A" sends the topology control message 102 to the network node "C" with the locally significant label "$\lambda$=R_CA", and to the network node "D" with the locally significant label "$\lambda$=R_DA". The network node "C" can identify the network topology 10 from the set of serialized arcs 116, and in response can update its label forwarding table in step 120 with a forwarding table entry specifying the network interface (e.g., "C1") having received the topology control message 102 from the network node "A", the locally significant label "λ=R_CA", and new locally significant labels (e.g., "λ=R_FC", "λ=R_EC") used as indices into the label forwarding table for data packets received from other network nodes (e.g., "F" via C-F; "E" via C-E). The network node "C" can output the topology control message 102 to the network nodes "E" and "F" using the locally significant labels "λ=R_EC" and "λ=R_FC", respectively.

Hence, the propagation in step 118 of the topology control message enables the network nodes 16 to establish the arc topology for reaching the omega node 14; further, insertion and swapping of locally significant labels at each network node enables each of the network nodes 16 to independently establish loop-free label switched paths for reaching the destination device 14 via the loop-free routing topology 10.

FIG. 9 illustrates an example method by the processor circuit 22 of the apparatus 20 of executing step 112 of FIG. 8, namely the serializing of the arc topology 10, according to an example embodiment. The method begins in step 112a based on the processor circuit 22 of the apparatus 20 identifying in step 112b each path (e.g., routing arc) 12 by its arc cursor 18, namely the identity of the network node 16 having position of the arc cursor 18 for a given routing arc 12. As illustrated in FIG. 10, each routing arc 12 as identified by its arc reference (ARC1 to ARC8) in FIG. 6I is given a serialized arc identifier 122 based on the corresponding network node 16 having possession of the arc cursor 18. For example, the network node "J" has possession of the cursor 18 for the routing arc "ARC2" 12; the network node "E" has possession of the arc cursor 18 for the routing arcs "ARC4" 12 and "ARC8", hence the serialized arc identifiers "E1" and "E2" are used to distinguish routing arcs 12 in instances where the same network node ("E") has possession of multiple arc cursors 18 for respective routing arcs 12 (see also the serialized arc identifiers "H1" and "H2" 122 to distinguish the routing arcs "ARC5" and "ARC6" having their respective arc cursors 18 controlled by the network node "H").

Hence, the serialized arc identifier 122 serves as metadata that identifies the network node 16 in the corresponding path (e.g., routing arc) 12 as possessing the corresponding our cursor 18 for control of traffic along the routing arc 12.

The processor circuit 20 of the apparatus 20 generates in step 112c a list 124 (illustrated in FIGS. 10 and 14) identifying a contiguous sequence of arc nodes 16 along the corresponding arc 12. For example, the serialized arc 114a provides the source route "{B, K, J, F, C, A}" along the arc having the serialized arc identifier "J" 122 for the routing arc "ARC2" in FIG. 6I. the processor circuit 20 also identifies in step 112d at least a first edge junction and a second edge junction of the routing arc 12 (i.e., exit nodes) that empties traffic from the routing arc to either the destination node 14 or another routing arc that is closer to the destination device 14 than the corresponding routing arc 12. As used in this description, any node (or nodes) within brackets "[ ]" identify an end of a routing arc (i.e., an exit node), such that the nodes "C" and "D" are the exit nodes for the routing arc "ARC4" in the serialized arc format 114b; the contiguous sequence of arc nodes within brackets "{ }" refers to intermediate junction nodes that are not exit nodes.

Figure 14:
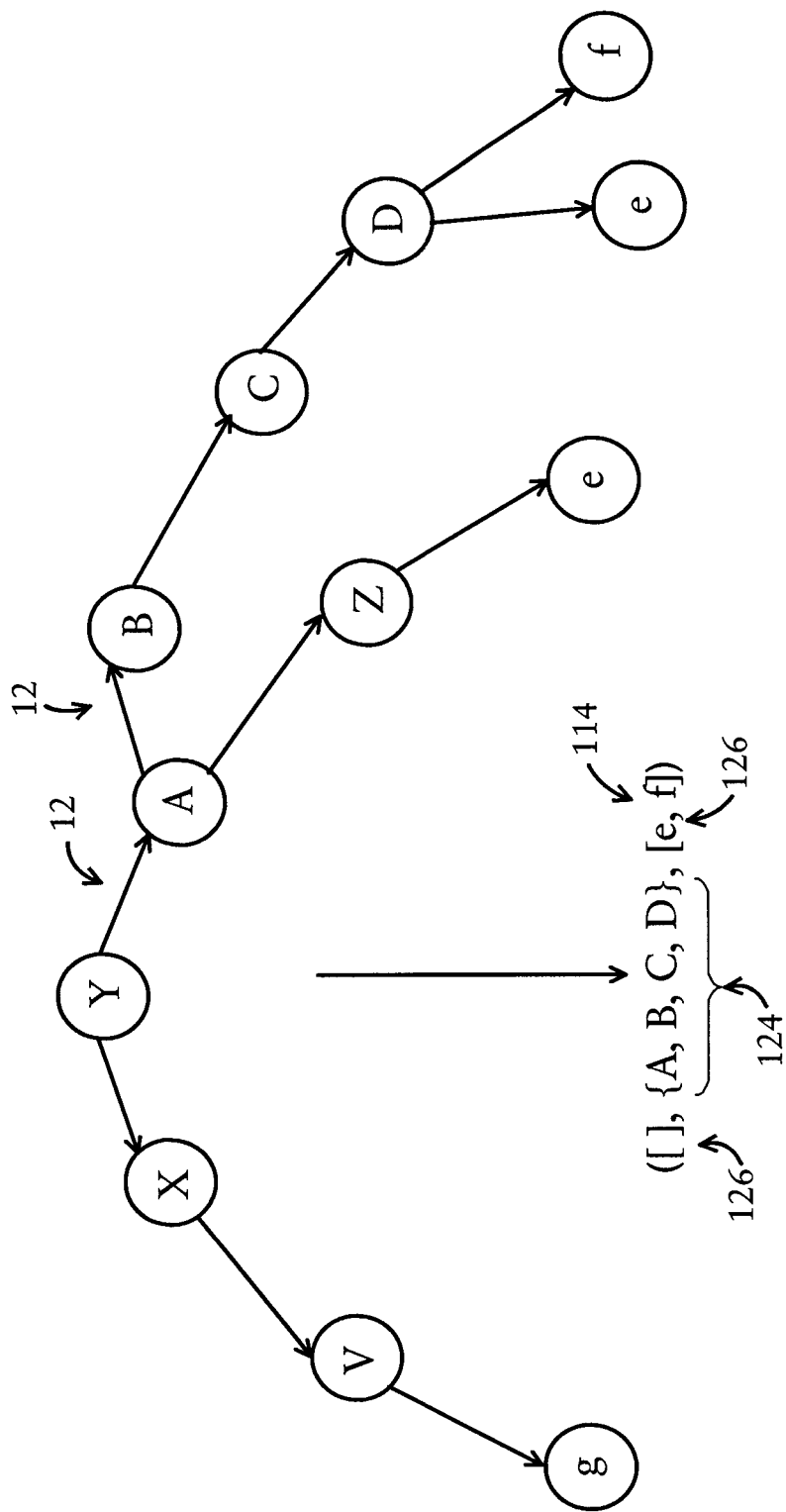
FIG. 14 illustrates an example serialized representation of a buttressing arc, according to an example embodiment.

As illustrated in FIG. 14, a serialized arc format 114 also can be generated in step 112e for a buttressing arc having zero (i.e., null) exit nodes on one end of the routing arc 12 a contiguous sequence of arc nodes along the buttressing arc (A, B, C, and D), with a list of exit nodes (e, f) coupled to the last network node "D".

Hence, the serialized arc format 114 for each routing arc 12 includes a first list of exit nodes 126, followed by a source route 124 of nodes along the arc, ending with another list 126 of exit nodes of the arc, enabling the formation of a complete source route along the corresponding arc 12; in the case of a buttressing arc as in FIG. 14, one of the lists 126 can have null entries, however the other list 126 must specify at least one exit node for the arc. Hence, the serialized arc format 114 includes metadata for identifying the art cursor (via the serialized arc identifier 122), exit nodes (126), and the intermediate nodes 124 between the exit nodes and along the routing arc 12.

Hence, in step 112 of FIGS. 8 and 9 the processor circuit 22 of the apparatus 20 assembles the serialized arc formats 114 for each of the individual arcs 12 into a single set 116 of serialized arcs. As described previously, the single set 116 of serialized arcs are output by the destination (omega) node 14 to the network nodes for propagation in step 118 of the topology control messages 102 to enable building of the label switched paths by the network nodes 16.

Figure 11:
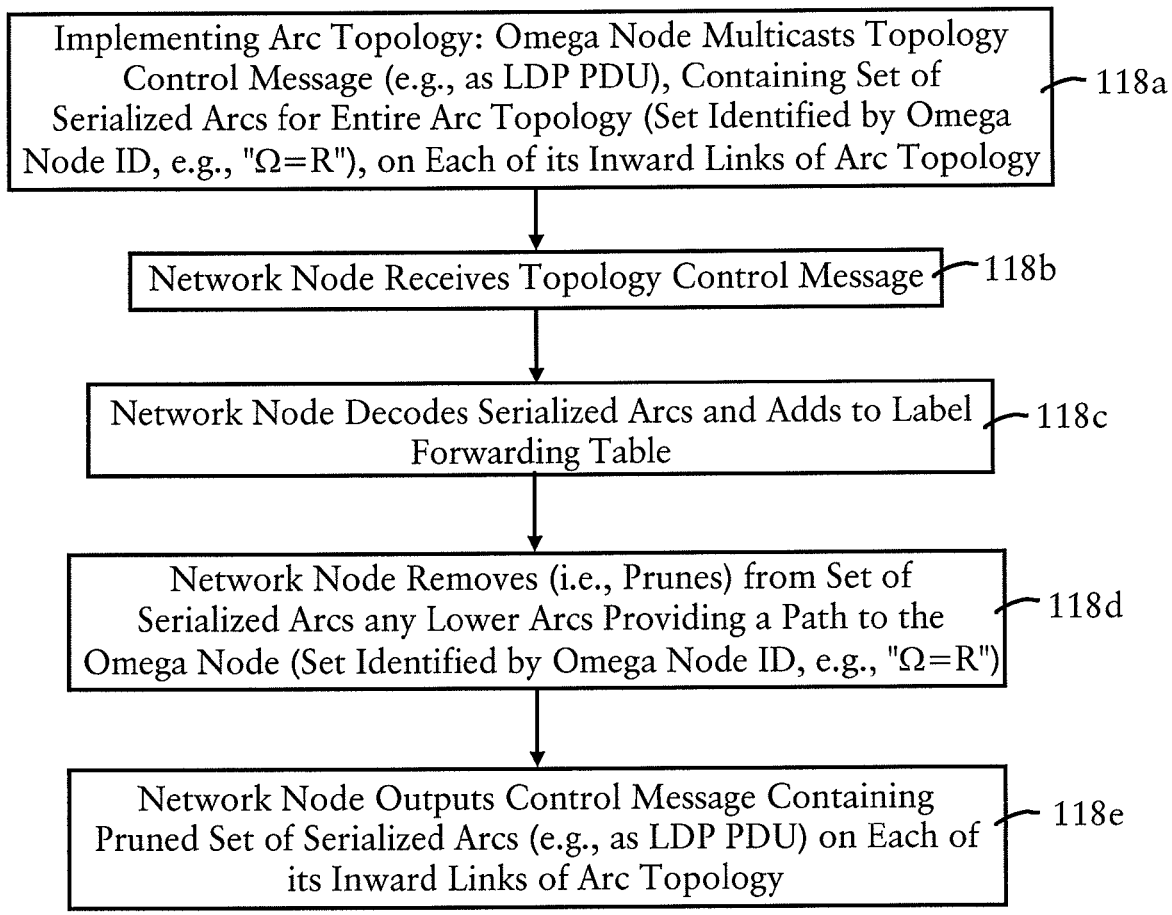
FIG. 11 illustrates implementing the loop-free routing topology based on propagating the set of serialized representations from the destination device to network nodes in the computing network, according to an example embodiment.

FIG. 11 illustrates example propagation 118 of the topology control messages 102 throughout the network nodes 16, according to an example embodiment. The omega node 14 outputs in step 118a the topology control message 102, for example as a label distribution protocol (LDP) protocol data unit (PDU). As described previously, the topology control message 102 includes a set 116 of all the serialized arcs (114a through 114h); further, each topology control message 102 output by each network node 16 specifies a corresponding unique locally significant label "λ" for associating the LDP PDU to the forwarding equivalence class "Ω=R".

In response to a network node 16 receiving in step 118b a topology control message 102, the corresponding processor circuit 22 of the network node 16 can parse from the topology control message 102 the locally significant label "λ", and the set 116 of serialized representations containing the serialized arc identifiers 122 and the serialized arc formats 114 describing the respective paths 12. The corresponding processor circuit 22 of the network node 16 can decode in step 118c the serialized arcs, as identified by their respective serialized arc identifiers 122 and their respective serialized arc formats 114, and create the necessary entries into label forwarding table of the network node 16. The network node 16 can optionally remove (i.e. proven) in step 118d at least one of the serialized representations from the received topology control message 102 based on the corresponding path being positioned between the network node and the destination 14. The pruning of step 118d is described in further detail below with respect to FIG. 12. The network node 16 outputs in step 118e a modified (i.e., pruned) topology control message 102 on each of its inward arcs of the arcs topology 10, for propagation to the next network nodes in the topology 10.

FIG. 12 illustrates a selective pruning of selected paths 12 from the set 116 of serialized representations propagated in the topology control message 102 by network nodes within the loop-free routing topology 10, according to an example embodiment. The specific serialized arc formats 114 are omitted from FIG. 12 for simplicity, hence each arc is represented in FIG. 12 merely by its serialized arc identifier 122.

Steps 128a through 128m illustrate step 118d of FIG. 11 executed by the different outputing network nodes. As illustrated with respect to step 128a, there is no pruning performed in the output set of serialized arcs 116 when transmitting the topology control message 102 from the destination node (Ω=R) 14 to the nodes along the root arc "ARC2", namely from the destination node (Ω=R) 14 to either node "A" or "B", from node "A" to "C", from node "C" to node "F", from node "F" to node "J", etc. to node "B"; from node "B" to node "K", from node "K" to node "J", etc.

Hence, the topology control message 102 output from the destination node (Ω=R) 14 to node "A" is propagated around the arc "ARC2" 12, enabling each network node 16 node along the path ARC2" 12 in the first direction to update its label forwarding table with the source node's locally significant label λ, and swap with a new locally significant label λ' for use by the next hop node; similarly, the topology control message 102 output from the destination node (Ω=R) 14 to node "B" is propagated around the arc "ARC2" 12, enabling each network node 16 along the path "ARC2" 12 in the second direction to update its label forwarding table with the source node's locally significant label λ", and swap with a new locally significant label λ'" for use by the next hop node.

In contrast, the network nodes 16 in the routing arcs above the root arc "ARC2" 12 (identified by its serialized art identifier "J" 122) do not need the topology information for the root arc; hence, the network nodes "A", "C", and "F" can selectively prune the full set of serialized arcs 116a as illustrated in steps 128b, 128c, 128d, 128e. for example, in step 128b the network nodes "A" and "C" can prune the serialized arcs "J" and "M" (as represented in FIG. 10) from the set of serialized arcs 116a, in order to send the pruned set 116b to the network node "D"; similarly, the network nodes "C" and "E" can prune in step 128c the serialized arcs "J", "M", and "D" from the set of serialized arcs 116a, in order to send the pruned set 116c to the network node "E"; the network node "F" can prune in step 128d the serialized arcs "J", "M", "D", "E1", and "E2" from the set of serialized arcs 116a, in order to send the pruned set 116d to the network node "H"; the network node "F" also can prune in step 128e the serialized arcs "J", "M", "D", "E1", "E2", "H1", and "H2" from the set of serialized arcs 116a, in order to send the pruned set 116e to the network node "I".

Steps 128f through 128l illustrated further pruning that can be executed by other nodes in arcs that are above the root arc ARC2. Hence, each network node can selectively prune at least one of the serialized representations 114 from the received topology control message 102 based on the corresponding path 12 being positioned between the at least one network node and the destination device 14, and output the modified (i.e., pruned) topology control message to another one of the network nodes away from the destination and the selectively pruned path.

Figure 13:
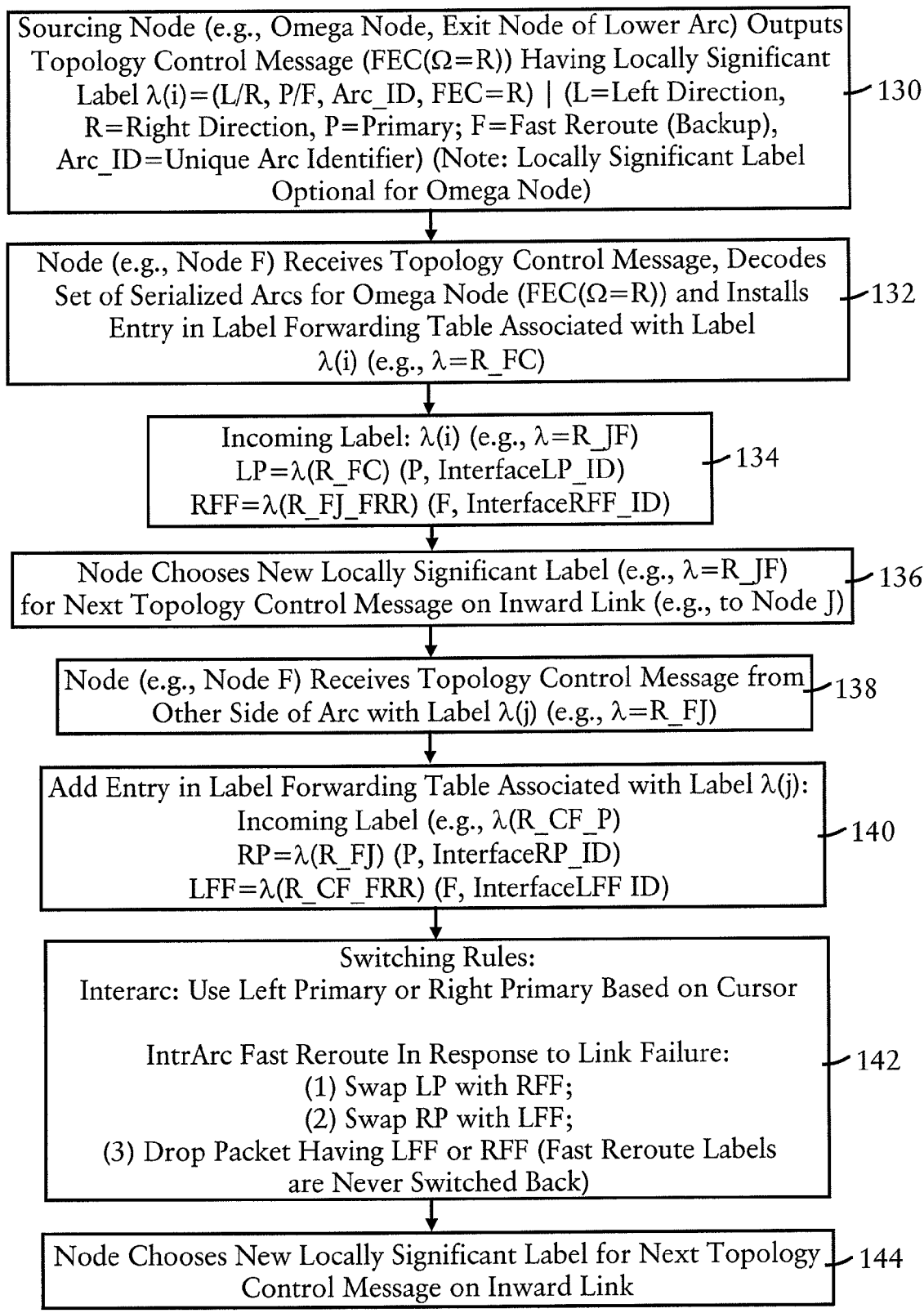
FIG. 13 illustrates an example method of the establishment of loop-free label switched paths by the network nodes receiving the set of serialized representations from the destination device, according to an example embodiment.

FIG. 13 illustrates an example method of establishing the loop-free label switched paths by the network nodes receiving the set when 16 of serialized representations from the destination device 14, according to an example embodiment.

As described previously, the sourcing network node (e.g., the destination node (Ω=R) 14 or an exit node of a lower routing arc 12) outputs a topology control message 102 specifying the forwarding equivalence class (FEC) for the destination node (Ω=R) 14; the topology control message 102 also specifies a locally significant label λ that is unique for the sourcing node based on path direction, whether the path is the primary (default) path or a fast reroute (backup) path, arc identifier, and the forwarding equivalency class.

Assume the receiving network node that receives in step 130 the topology control message 102 is node "F" that receives the topology control message from the node C: the topology control message specifies the label "λ=R_FC" generated by the node "C" (i.e., for the FEC=R, output on link C-F in the "LEFT" direction from node F to node C). In response, the node "F" decodes in step 132 the set of serialized arcs for the forwarding equivalence class and installs an entry in the label forwarding table associated with the locally significant label "λ=R_FC" specified in the topology control message 102.

FIG. 15 illustrates an example label forwarding table 148 stored in the memory circuit 26 of the network node "F" 16, according to an example embodiment. In particular, the processor circuit 22 of the node "F" creates an entry in step 134 of FIGS. 13 and 15, using the new label "λ=R_JF" created by node "F" as an index: hence, any data packet received by node "F" (e.g., from node J) containing the label "λ=R_JF" is swapped with the left primary swap label (LP) "λ=R_FC" and output on the network interface identified as "InterfaceLP_ID" to the link F-C for switching to the node "C"; if the node "F" detects a failure on the link C-F, then fast reroute can be instantly implemented by swapping the label "λ=R_JF" with the right-direction fast reroute (RFF) label "λ=R_FJ_FRR" and outputting the packet on the interface "InterfaceRFF_ID" for transmission of the data packet via the link F-J back to the node "J".

The network node (e.g., "F") can choose in step 136 a new locally significant label for each of the other next hop nodes that did not send the topology control message 102, and forward the topology control message on the inward links (e.g., F-J, F-I, F-H, or F-E). The relevant table entries also are created in step 150 of FIG. 15. For example, the network node "F" would send to the network node "J" the topology control message 102 specifying the set of serialized representations, and the labels "λ=R_JF" for the default path and "λ=R_FJ_FRR" for the fast reroute (FRR) path.

Assuming in step 138 that another topology control message 102 is received from the other side of the arc (e.g., "F" receives the message 102 from node "J" with the label "λ=R_FJ"), the node "F" can add the corresponding entry in the label forwarding table in step 140, including a right primary swap label (RP) and a left fast reroute (LFF), enabling association of the locally significant label (e.g., "λ=R_CF") as described previously, but in the opposite direction.

The processor circuit 22 in each network node 16 also implements switching rules in step 142, illustrated in FIG. 15 based on the incoming label. In particular, for Inter-arc switching 152, either the left primary or right primary labels may be used depending on the position of the network node relative to the arc cursor. For intra-arc (i.e. within the arc) switching 154, loop-free fast reroute is utilized in response to a detected local link failure: (1) a left primary (LP) label is swapped with a Right Fast Reroute (RFF) label; (2) a right primary (RP) label is swapped with a Left Fast Reroute (LFF) label; and (3) any received packet having a RFF label or LFF label is dropped to prevent the formation of a loop (156 of FIG. 15).

Hence, fast reroute is implemented instantly in response to a detected link failure: four label switched paths are maintained by each network node, namely: left-primary (in the left direction), right-fast reroute (in the right direction in response to a detected link failure for left-primary), right-primary (in the right direction), and left-fast reroute (in the left direction in response to a detected link failure for right-primary). Further, a fast reroute label state is propagated in the rerouted direction; hence, a second link failure in the same arc will cause the data packet to be dropped, avoiding the formation of a loop.

The topology control message received in step 144 also is forwarded after a new locally significant label is chosen.

According to the example embodiments, labels can be established within a routing topology that enables full redundancy in two connected graphs: a new label distribution protocol format is introduced that contains a new non-linear source route information to describe the routing arc topology. Each routing arc allows one link failure, hence the arc topology can support multiple concurrent link failures that might occur in different routing arcs. Further, the label distribution protocol can be deployed automatically and independently by the network nodes in the computing network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
creating, in a computing network, a loop-free routing topology for reaching a destination device, the loop-free routing topology comprising a set of distinct paths for reaching the destination device, wherein the loop-free routing topology provides, to each network node having at least two data links in the network topology, at least two respective non-congruent paths that do not share any common data link for reaching the destination device;
generating a set of serialized representations describing all the paths of the loop-free routing topology, each serialized representation describing a corresponding one of the paths; and
propagating the set of serialized representations from the destination device to network nodes in the computing network, enabling the network nodes to establish loop-free label switched paths for reaching the destination device via the loop-free routing topology.

2. The method of claim 1, wherein each of the network nodes have a first label switched path for reaching the destination device along a first direction of one of the paths and a second label switched path for reaching the destination device via a second, distinct direction of the one path.

3. The method of claim 2, wherein each of the paths are routing arcs comprising at least first and second junction nodes, and a third node selectively directing traffic toward the destination device via one of the first junction node using the first label switched path, or the second junction node using the second label switched path, the first and second junction nodes each coupled to one of the destination device, or a network node in another routing arc that is closer to the destination device than the corresponding routing arc.

4. The method of claim 3, wherein the generating includes generating, for each serialized representation, a source route path along the corresponding path to at least one of the first junction node or the second junction node via the corresponding third node, each serialized representation identifying the corresponding first and second junction nodes as junction nodes for the corresponding path, the set of serialized representations including the source route paths for the paths of the loop-free routing topology.

5. The method of claim 3, wherein each serialized representation include metadata identifying one of the network nodes in the corresponding path as possessing an arc cursor for control of traffic along the routing arc.

6. The method of claim 2, wherein each of the network nodes further include a third label switched path and a fourth label switched path, the third label switched path along the second direction enabling instant rerouting of a data packet by the corresponding network node in response to a failure of the corresponding first label switched path, the fourth label switched path along the first direction enabling instant rerouting of a data packet by the corresponding network node in response to a failure of the corresponding second label switched path, wherein any failure detected following switching of the data packet using the third label switched path or fourth label switched path causes the data packet to be dropped to prevent loop formation.

7. The method of claim 1, wherein the propagating includes the destination device outputting a topology control message containing the set of serialized representations to the network nodes.

8. The method of claim 7, further comprising at least one of the network nodes transmitting a modified topology control message based on:
receiving the topology control message;
selectively pruning at least one of the serialized representations from the received topology control message based on the corresponding path being positioned between the at least one network node and the destination; and
outputting the modified topology control message to another one of the network nodes away from the destination and the selectively pruned path.

9. The method of claim 1, wherein each serialized representation includes metadata identifying one or more ends of the corresponding path coupling the path at least one of another path in the routing topology, or the destination device.

10. An apparatus comprising:
a processor circuit configured for creating, for a computing network, a loop-free routing topology for reaching a destination device, the loop-free routing topology comprising a set of distinct paths for reaching the destination device, wherein the loop-free routing topology provides, to each network node having at least two data links in the network topology, at least two respective non-congruent paths that do not share any common data link for reaching the destination device, the processor circuit further configured for generating a set of serialized representations describing all the paths of the loop-free routing topology, each serialized representation describing a corresponding one of the paths; and
a network interface circuit configured for propagating the set of serialized representations from the destination device to network nodes in the computing network, enabling the network nodes to establish loop-free label switched paths for reaching the destination device via the loop-free routing topology.

11. The apparatus of claim 10, wherein the set of serialized representations enable each of the network nodes to establish a first label switched path for reaching the destination device along a first direction of one of the paths and a second label switched path for reaching the destination device via a second, distinct direction of the one path.

12. The apparatus of claim 11, wherein each of the paths are routing arcs comprising at least first and second junction nodes, and a third node selectively directing traffic toward the destination device via one of the first junction node using the first label switched path, or the second junction node using the second label switched path, the first and second junction nodes each coupled to one of the destination device, or a network node in another routing arc that is closer to the destination device than the corresponding routing arc.

13. The apparatus of claim 12, wherein the processor circuit is configured for generating, for each serialized representation, a source route path along the corresponding path to at least one of the first junction node or the second junction node via the corresponding third node, each serialized representation identifying the corresponding first and second junction nodes as junction nodes for the corresponding path, the set of serialized representations including the source route paths for the paths of the loop-free routing topology.

14. The apparatus of claim 12, wherein each serialized representation include metadata identifying one of the network nodes in the corresponding path as possessing an arc cursor for control of traffic along the routing arc.

15. The apparatus of claim 11, wherein the set of serialized representations enable each of the network nodes to further establish a third label switched path and a fourth label switched path, the third label switched path along the second direction enabling instant rerouting of a data packet by the corresponding network node in response to a failure of the corresponding first label switched path, the fourth label switched path along the first direction enabling instant rerouting of a data packet by the corresponding network node in response to a failure of the corresponding second label switched path, wherein any failure detected following switching of the data packet using the third label switched path or fourth label switched path causes the data packet to be dropped to prevent loop formation.

16. The apparatus of claim 10, wherein the set of serialized representations causes the destination device to output a topology control message containing the set of serialized representations to the network nodes.

17. The apparatus of claim 16, wherein the set of serialized representations enables at least one of the network nodes to transmit a modified topology control message based on:
receiving the topology control message;
selectively pruning at least one of the serialized representations from the received topology control message based on the corresponding path being positioned between the at least one network node and the destination; and
outputting the modified topology control message to another one of the network nodes away from the destination and the selectively pruned path.

18. The apparatus of claim 10, wherein each serialized representation includes metadata identifying one or more ends of the corresponding path coupling the path at least one of another path in the routing topology, or the destination device.

19. Logic encoded in one or more non-transitory tangible media for execution and when executed operable for:
creating, in a computing network, a loop-free routing topology for reaching a destination device, the loop-free routing topology comprising a set of distinct paths for reaching the destination device, wherein the loop-free routing topology provides, to each network node having at least two data links in the network topology, at least two respective non-congruent paths that do not share any common data link for reaching the destination device;
generating a set of serialized representations describing all the paths of the loop-free routing topology, each serialized representation describing a corresponding one of the paths; and
propagating the set of serialized representations from the destination device to network nodes in the computing network, enabling the network nodes to establish loop-free label switched paths for reaching the destination device via the loop-free routing topology.

20. The logic of claim 19, wherein each of the network nodes have a first label switched path for reaching the destination device along a first direction of one of the paths and a second label switched path for reaching the destination device via a second, distinct direction of the one path.

* * * * *